US012603096B2

(12) United States Patent
Xiao et al.

(10) Patent No.: US 12,603,096 B2
(45) Date of Patent: Apr. 14, 2026

(54) VOICE ENHANCEMENT METHODS AND SYSTEMS

(71) Applicant: SHENZHEN SHOKZ CO., LTD., Guangdong (CN)

(72) Inventors: Le Xiao, Shenzhen (CN); Chengqian Zhang, Shenzhen (CN); Fengyun Liao, Shenzhen (CN); Xin Qi, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 229 days.

(21) Appl. No.: 18/330,472

(22) Filed: Jun. 7, 2023

(65) Prior Publication Data

US 2023/0317093 A1 Oct. 5, 2023

Related U.S. Application Data

(63) Continuation of application No. PCT/CN2021/085039, filed on Apr. 1, 2021.

(51) Int. Cl.
*G10L 21/0216* (2013.01)
*G10L 21/0208* (2013.01)
*G10L 21/0232* (2013.01)

(52) U.S. Cl.
CPC .................................. *G10L 21/0232* (2013.01)

(58) Field of Classification Search
CPC ............. G10L 21/0232; G10L 21/0216; G10L 21/0208
See application file for complete search history.

(56) References Cited

U.S. PATENT DOCUMENTS

| | | | | |
|---|---|---|---|---|
| 10,192,567 | B1 * | 1/2019 | Kamdar | G10L 25/84 |
| 11,259,117 | B1 * | 2/2022 | Chelliah | G10L 21/0216 |
| 2006/0013412 | A1 | 1/2006 | Goldin | |
| 2018/0012614 | A1 * | 1/2018 | Soleymani | G10L 19/0216 |

(Continued)

FOREIGN PATENT DOCUMENTS

| | | | |
|---|---|---|---|
| CN | 101894563 | A | 11/2010 |
| CN | 102074246 | A | 5/2011 |

(Continued)

OTHER PUBLICATIONS

Yao et al., A priori SNR estimation and noise estimation for speech enhancement, 2016, EURASIP Journal on Advances in Signal Processing (Year: 2016).*

(Continued)

*Primary Examiner* — Pierre Louis Desir
*Assistant Examiner* — Cody Douglas Hutcheson
(74) *Attorney, Agent, or Firm* — METIS IP LLC

(57) ABSTRACT

The embodiments of the present disclosure provide a method and system for voice enhancement, including: obtaining a first signal and a second signal of a target voice, the first signal and the second signal being voice signals of the target voice at different voice collection positions; determining a target signal-to-noise ratio (SNR) of the target voice based on the first signal or the second signal; determining a processing mode for the first signal and the second signal based on the target SNR; and processing the first signal and the second signal based on the determined processing mode to obtain a voice-enhanced output voice signal corresponding to the target voice.

13 Claims, 13 Drawing Sheets

(56) References Cited

U.S. PATENT DOCUMENTS

| | | | |
|---|---|---|---|
| 2018/0167747 A1 | 6/2018 | Kuriger et al. |
| 2020/0265857 A1 | 8/2020 | Zhu et al. |
| 2021/0287687 A1 | 9/2021 | Disch et al. |

FOREIGN PATENT DOCUMENTS

| | | | |
|---|---|---|---|
| CN | 102623016 | | 8/2012 |
| CN | 102623016 A | * | 8/2012 |
| CN | 104464745 | | 3/2015 |
| CN | 104575511 | | 4/2015 |
| CN | 105427859 A | | 3/2016 |
| CN | 107967918 | | 4/2018 |
| CN | 109410976 | | 3/2019 |
| CN | 110085246 | | 8/2019 |
| CN | 110310651 | | 10/2019 |
| CN | 112116918 | | 12/2020 |
| JP | 2013068919 | | 4/2013 |
| WO | 2010029247 A1 | | 3/2010 |
| WO | 2013065010 A1 | | 5/2013 |

OTHER PUBLICATIONS

Stahl et al., A Simple and Effective Framework for A Priori SNR Estimation, 2018, ICASSP 2018 (Year: 2018).*

Nelke et al., Dual Microphone Wind Noise Reduction by Exploiting the Complex Coherence, 2014, ITG-Fachbericht 252: Speech Communication, 24.-26. (Year: 2014).*

Hilbert, FFT Zero Padding, 2013, Obtained from: https://www.bitweenie.com/listings/fft-zero-padding/ (Year: 2013).*

Montana State University, Using a Fast Fourier Transform Algorithm, 2007 (Year: 2007).*

Luo et al., Adaptive Null-Forming Scheme in Digital Hearing Aids, 2002, IEEE Transactions on Signal Processing, vol. 50, No. 7 ( Year: 2002).*

International Search Report in PCT/CN2021/085039 mailed on Jan. 4, 2022, 7 pages.

Harald Gustafsson et al., Dual-Microphone Spectral Subtraction, ResearchGate, 2000, 38 pages.

"A Survey of Beamforming Algorithms", Web page <https://www.cnblogs.com/LXP-Never/p/12239399.html>, Mar. 1, 2020.

Gong, Qin et al., Beamforming and Maximum Likelihood Estimation for Speech Enhancement Using Dual Closely-Spaced Microphones, Journal of Tsinghua University, Science and Technology, 58(6): 603-608, 2018.

Philipos C. Loizou, Speech Enhancement: Theory and Practice, University of Electronic Science and Technology Press, 2012, 4 pages.

Takuya Higuchi et al., Robust MVDR Beamforming Using Time-Frequency Masks for Online/Offline ASR in Noise, International Conference on Acoustics, Speech and Signal Processing , 2016, 5 pages.

Gong, Qin et al., Speech enhancement algorithm for cochlear implants to suppress multi-directional speech noise, Journal of Tsinghua University, Science and Technology, 60(2): 181-188, 2020, 8 pages.

Zhang, Xueliang et al., A Speech Enhancement Algorithm by Iterating Single-and Multi-Microphone Processing and Its Application to Robust ASR, International Conference on Acoustics, 2017, 5 pages.

Sophocles J.Orfanidis, Introduction to Signal Processing, Tsinghua University Press, pp. 475-520, 1999.

Zhang, Xiaomin, The Research and Implementation of Dual-channel Speech Enhancement System, China Master's Theses Full-text Database (CMFD)—Information Science and Technology, 2013, 74 pages.

First Office Action in Chinese Application No. 202180068601.4 mailed on Dec. 30, 2025, 33 pages.

* cited by examiner

100

300

600

VOICE ENHANCEMENT METHODS AND SYSTEMS

CROSS-REFERENCE TO RELATED APPLICATION

This application is a continuation of International Patent Application No. PCT/CN2021/085039, filed on Apr. 1, 2021, the contents of which are entirely incorporated herein by reference.

TECHNICAL FIELD

The present disclosure relates to the field of computer technology, particularly to a processing method and system for voice enhancement.

BACKGROUND

With the rapid progress of science and technology, in technical fields such as communication and voice collection, the quality requirement for voice signals is getting higher and higher. In scenarios such as voice calls and voice signal collection, there may be interference from various noise signals such as environmental noise and other people's voices, etc., resulting in the collected target voice being not a clean voice signal, which affects the quality of the voice signal and leads to issues such as unclear speech and poor call quality.

Therefore, it is desired to provide a voice enhancement method and system.

SUMMARY

An aspect of the specification provides a voice enhancement method, including: obtaining a first signal and a second signal of a target voice, the first signal and the second signal being the voice signals of the target voice at different voice collection positions; determining a target signal-to-noise ratio (SNR) of the target voice based on the first signal or the second signal; determining a processing mode for the first signal and the second signal based on the target SNR; and obtaining a voice-enhanced output voice signal corresponding to the target voice by processing the first signal and the second signal based on the determined processing mode.

Another aspect of the present disclosure provides a voice enhancement system, including: a first voice obtaining module configured to obtain a first signal and a second signal of a target voice, the first signal and the second signal being voice signals of the target voice at different voice collection positions; an SNR determination module configured to determine a target SNR of the target voice based on the first signal or the second signal; an SNR discrimination module, configured to determine a processing mode for the first signal and the second signal based on the target SNR; and a first enhancement processing module, configured to obtain a voice-enhanced output voice signal corresponding to the target voice by processing the first signal and the second signal based on the determined processing mode.

Another aspect of the present disclosure provides another voice enhancement method, including: obtaining a first signal and a second signal of a target voice, the first signal and the second signal being voice signals of the target voice at different voice collection positions; obtaining a first output voice signal with a low frequency part of the target voice enhanced by processing a low frequency part of the first signal and a low frequency part of the second signal by using a first processing technique; obtaining a second output voice signal with a high frequency part of the target voice enhanced by processing a high frequency part of the first signal and a high frequency part of the second signal by using a second processing technique; and obtaining a voice-enhanced output voice signal corresponding to the target voice by combining the first output voice signal and the second output voice signal.

Another aspect of the present disclosure provides another voice enhancement system, including: a second voice obtaining module configured to obtain a first signal and a second signal of a target voice, the first signal and the second signal being voice signals of the target voice at different voice collection positions; a second enhancement processing module configured to obtain a first output voice signal with a low frequency part of the target voice enhanced by processing a low frequency part of the first signal and a low frequency part of the second signal by using a first processing technique; and obtain a second output voice signal with a high frequency part of the target voice enhanced by processing a high frequency part of the first signal and a high frequency part of the second signal by using a second processing technique; and a second processing output module configured to obtain a voice-enhanced output voice signal corresponding to the target voice by combining the first output voice signal and the second output voice signal.

One aspect of the present disclosure provides another voice enhancement method, including: obtaining a first signal and a second signal of a target voice, the first signal and the second signal being voice signals of the target voice at different voice collection positions; obtaining a first downsampling signal and a second downsampling signal by respectively performing a downsampling on the first signal and the second signal; obtaining an enhanced voice signal corresponding to the target voice by processing the first downsampling signal and the second downsampling signal; and obtaining an output voice signal corresponding to the target voice by upsampling a part of the enhanced voice signal corresponding to the first downsampling signal and the second downsampling signal.

Another aspect of the present disclosure provides another voice enhancement system, including: a third voice obtaining module, configured to obtain a first signal and a second signal of a target voice, the first signal and the second signal being voice signals of the target voice at different voice collection positions; a third sampling module, configured to obtain a first downsampling signal and a second downsampling signal by respectively performing a downsampling on the first signal and the second signal; a third enhanced processing module, configured to obtain an enhanced voice signal corresponding to the target voice by processing the first downsampling signal and the second downsampling signal; and a third processing output module, configured to obtain an output voice signal corresponding to the target voice by upsampling a part of the enhanced voice signal corresponding to the first downsampling signal and/or the second downsampling signal.

Another aspect of the present disclosure provides another voice enhancement method, including: obtaining a first signal and a second signal of a target voice, the first signal and the second signal being voice signals of the target voice at different voice collection positions; determining at least one first sub-band signal corresponding to the first signal and at least one second sub-band signal corresponding to the second signal; determining at least one sub-band target SNR of the target voice based on the at least one first sub-band signal or the at least one second sub-band signal; determining a processing mode for the at least one first sub-band signal and the at least one second sub-band signal based on the at least one sub-band target SNR; and obtaining a voice-enhanced output voice signal corresponding to the target voice by processing the at least one first sub-band signal and the at least one second sub-band signal based on the determined processing mode.

Another aspect of the present disclosure provides another voice enhancement system, including: a fourth voice obtaining module configured to obtain a first signal and a second signal of a target voice, the first signal and the second signal being voice signals of the target voice at different voice collection positions; a sub-band determination module configured to determine at least one first sub-band signal corresponding to the first signal and at least one second sub-band signal corresponding to the second signal; a sub-band SNR determination module configured to determine at least one sub-band target SNR of the target voice based on the at least one first sub-band signal or the at least one second sub-band signal; a sub-band SNR discrimination module configured to determine a processing mode for the at least one first sub-band signal and the at least one second sub-band signal based on the at least one sub-band target SNR; and a fourth enhancement processing module, configured to obtain a voice-enhanced output voice signal corresponding to the target voice by processing the at least one first sub-band signal and the at least one second sub-band signal based on the determined processing mode.

Another aspect of the present disclosure provides a voice enhancement device, including at least one storage medium and at least one processor. The at least one storage medium is configured to store a computer instruction; and the at least one processor is configured to execute the computer instruction to implement any one of the aforementioned voice enhancement method.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
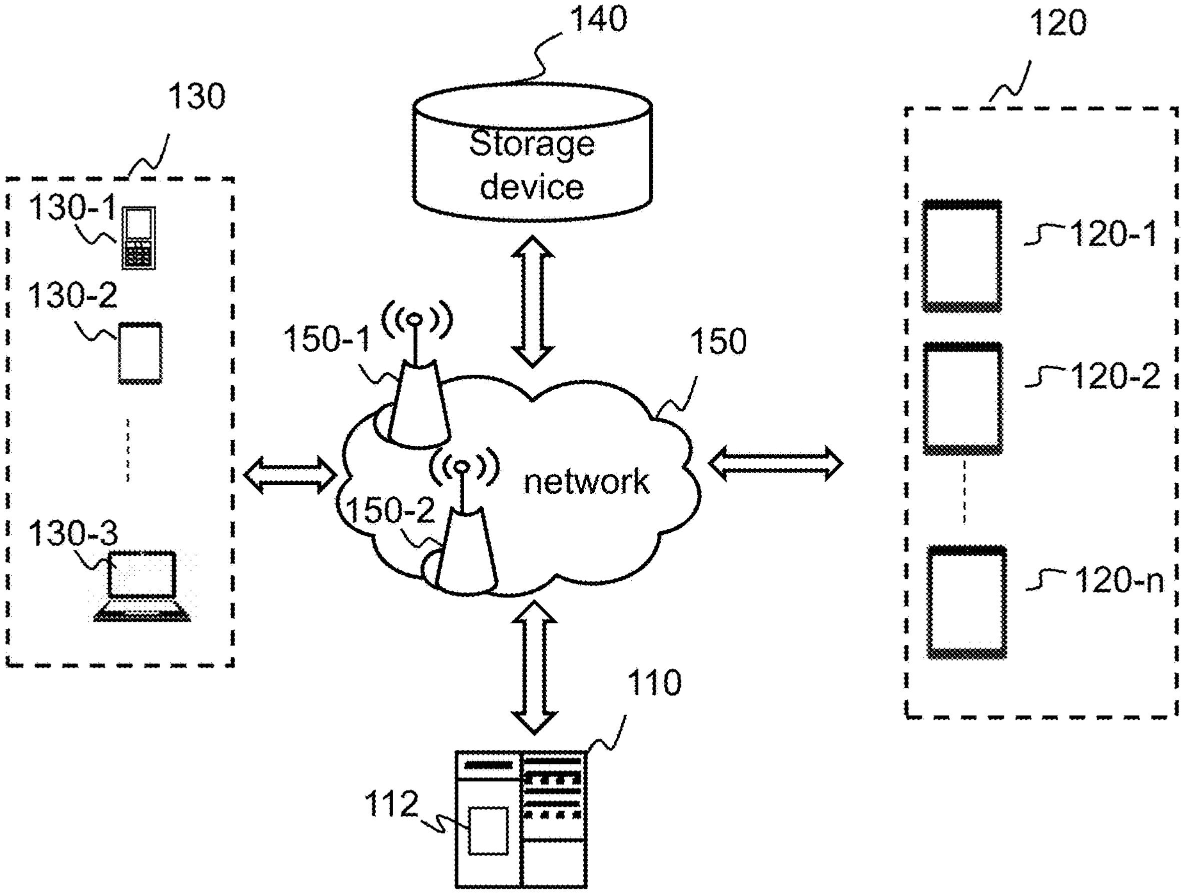
FIG. 1 is a schematic diagram illustrating an application scenario of a voice enhancement system according to some embodiments of the present disclosure.

To the following detailed description, numerous specific details are set forth by way of examples in order to provide a thorough understanding of the relevant disclosure. Obviously, the drawings described below are only some examples or embodiments of the present disclosure. Those skilled in the art, without further creative efforts, may apply the present disclosure to other similar scenarios according to these drawings. It should be understood that the purposes of these illustrated embodiments are only provided to those skilled in the art to practice the application, and not intended to limit the scope of the present disclosure. Unless obviously obtained from the context or the context illustrates otherwise, the same numeral in the drawings refers to the same structure or operation.

It should be understood that "system," "device," "unit," and/or "module" used in the present disclosure are one method for distinguishing different parts, elements, components, partial or assemblies of different levels. However, the terms may be displaced by another expression if they achieve the same purpose.

The terminology used herein is for the purposes of describing particular examples and embodiments only and is not intended to be limiting. As used herein, the singular forms "a," "an," and "the" may be intended to include the plural forms as well, unless the context clearly indicates otherwise. It will be further understood that the terms "include" and/or "comprise," when used in this disclosure, specify the presence of integers, devices, behaviors, stated features, steps, elements, operations, and/or components, but do not exclude the presence or addition of one or more other integers, devices, behaviors, features, steps, elements, operations, components, and/or groups thereof.

The flowcharts used in the present disclosure illustrate operations that the system implements according to some embodiments of the present disclosure. It should be understood that the foregoing or following operations may not necessarily be performed exactly in order. Instead, various operations may be processed in reverse order or simultaneously. Besides, one or more other operations may be added to these processes, or one or more operations may be removed from these processes.

FIG. 1 is a schematic diagram illustrating an application scenario of a voice enhancement system according to some embodiments of the present disclosure.

A voice enhancement system 100 shown in some embodiments of the present disclosure may be applied in various software, systems, platforms, and devices to implement voice signal enhancement processing. For example, the voice enhancement system 100 may be applied to perform a voice enhancement processing on a user's voice signal obtained by various software, systems, platforms, and devices, and the voice enhancement system 100 may further be applied to perform the voice enhancement processing when using devices (such as a mobile phone, a tablet, a computer, an earphone, etc.) for a voice call.

In the voice call scene, there may be interference from various noise signals such as environmental noise and other people's voices, as a result, the collected target voice may not be a clean voice signal. To improve the quality of the voice call, it is necessary to perform voice enhancement processing such as noise filtering and voice signal enhancement on a target voice to obtain a clean voice signal. The present disclosure discloses a system and method for voice enhancement, which can implement the voice enhancement processing on the target voice in the above-mentioned voice call scene, for example.

As shown in FIG. 1, the voice enhancement system 100 may include a processing device 110, a collection device 120, a terminal 130, a storage device 140, and a network 150.

In some embodiments, the processing device 110 may process data and/or information obtained from other devices or system components. The processing device 110 may perform program instructions based on these data, information, and/or processing results to perform one or more functions described in the present disclosure. For example, the processing device may receive and process a first signal and a second signal of the target voice, and output a voice-enhanced output voice signal.

Figure 2:
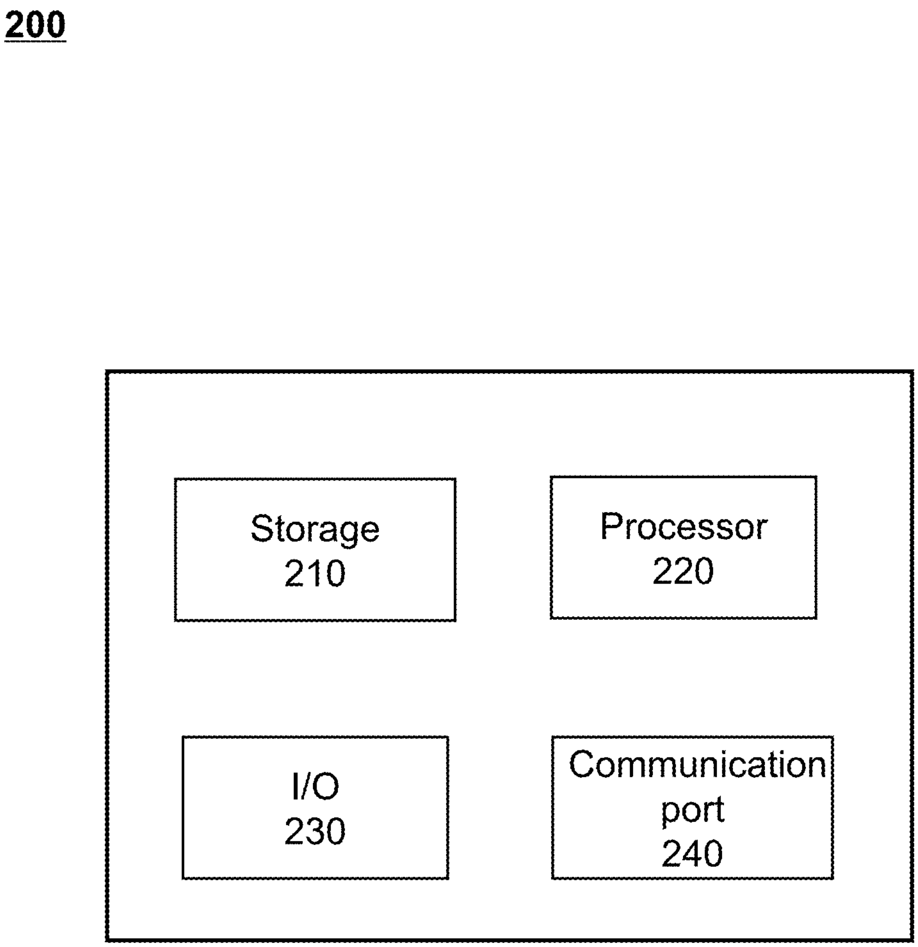
FIG. 2 is a schematic diagram illustrating an exemplary hardware and/or software component of a computing device according to some embodiments of the present disclosure.

In some embodiments, the processing device 110 may be a single processing device or a group of processing devices, such as a server or a group of servers. The group of processing devices may be centralized or distributed (e.g., the processing device 110 may be a distributed system). In some embodiments, the processing device 110 may be local or remote. For example, the processing device 110 may access information and/or data in the collection device 120, the terminal 130, and the storage device 140 through the network 150. As another example, the processing device 110 may be directly connected to the collection device 120, the terminal 130, and the storage device 140 to access stored information and/or data. In some embodiments, the processing device 110 may be implemented on a cloud platform. Merely by way of example, the cloud platform may include a private cloud, a public cloud, a hybrid cloud, a community cloud, a distribution cloud, an inter-cloud, a multiple cloud, etc., or any combination thereof. In some embodiments, the processing device 110 may be implemented on a computing device as shown in FIG. 2 of the present disclosure. For example, the processing device 110 may be implemented on one or more components of a computing device 200 as shown in FIG. 2.

In some embodiments, the processing device 110 may include a processing engine 112. The processing engine 112 may process data and/or information related to voice enhancement to perform one or more of the methods or functions described herein. For example, the processing engine 112 may obtain the target voice, the first signal, and the second signal of the target voice. The first signal and the second signal are voice signals at different voice collection positions corresponding to the target voice. In some embodiments, the processing engine 112 may respectively perform downsampling on the first signal and the second signal to obtain the first downsampling signal and the second downsampling signal, respectively. The processing engine 112 may process the first downsampling signal and the second downsampling signal to obtain an enhanced voice signal corresponding to the target voice. The processing engine 112 may further upsample a part of the enhanced voice signal corresponding to the first downsampling signal and/or the second downsampling signal to obtain the output voice signal corresponding to the target voice. In some embodiments, the processing engine 112 may use a first processing technique to process a low frequency part of the first signal and the low frequency part of the second signal to obtain a first output voice signal with the low frequency part of the target voice enhanced; and use a second processing technique to process a high frequency part of the first signal and the high frequency part of the second signal to obtain a second output voice signal with the high frequency part of the target voice enhanced. The processing engine 112 may further combine the first output voice signal and the second output voice signal to obtain a voice-enhanced output voice signal corresponding to the target voice. In some embodiments, the processing engine 112 may determine a target signal-to-noise ratio (SNR) of the target voice based on the first signal or the second signal; and determine a processing mode for the first signal and the second signal based on the target SNR. The processing engine 112 may further process the first signal and the second signal based on the determined processing mode to obtain the voice-enhanced output voice signal corresponding to the target voice. In some embodiments, the processing engine 112 may determine at least one first sub-band signal corresponding to the first signal and at least one second sub-band signal corresponding to the second signal. The processing engine 112 may determine at least one sub-band target SNR of the target voice based on the at least one first sub-band signal or the at least one second sub-band signal. The processing engine 112 may determine the processing mode of the at least one first sub-band signal and the at least one second sub-band signal based on the at least one sub-band SNR. The processing engine 112 may process the at least one first sub-band signal and the at least one second sub-band signal based on the determined processing mode to obtain the voice-enhanced output voice signal corresponding to the target voice.

In some embodiments, the processing engine 112 may include one or more processing engines (e.g. a single-chip processing engine or a multi-chip processor). Merely by way of example, the processing engine 112 may include a central processing unit (CPU), an application specific integrated circuit (ASIC), an application specific instruction set processor (ASIP), a graphics processing unit (GPU), a physical processing unit (PPU), a digital signal processing Device (DSP), a field programmable gate array (FPGA), a programmable logic device (PLD), a controller, a microcontroller unit, a reduced instruction set computer (RISC), a microprocessor, etc., or any combination thereof. In some embodiments, the processing engine 112 may be integrated into the collection device 120 or the terminal 130.

In some embodiments, the collection device 120 may be configured to collect voice signals of the target voice, for example, to collect the first signal and the second signal of the target voice. In some embodiments, the collection device 120 may be a single collection device or a group of collection devices. In some embodiments, the collection device 120 may be a device containing one or more microphones or other sound sensors such as devices 120-1, 120-2, . . . **120-2*n***

(such as a mobile phone, a headset, a walkie-talkie, a tablet, a computer, etc.). For example, the collection device 120 may include at least two microphones, and the at least two microphones are separated by a certain distance. When the collection device 120 collects a user's voice, the at least two microphones may simultaneously collect the voice from the user's mouth at different positions. The at least two microphones may include a first microphone and a second microphone. The first microphone may be located closer to the user's mouth, the second microphone may be located farther away from the user's mouth, and a connection line between the second microphone and the first microphone may extend toward the position of the user's mouth.

The collection device 120 may convert the collected voice into an electrical signal, and send the electrical signal to the processing device 110 for processing. For example, the first microphone and the second microphone may convert the collected user voice into the first signal and the second signal, respectively. The processing device 110 may implement the voice enhancement processing based on the first signal and the second signal.

In some embodiments, the collection device 120 may transmit information and/or data to the processing device 110, the terminal 130, and the storage device 140 through the network 150. In some embodiments, the collection device 120 may be directly connected to the processing device 110 or the storage device 140 to transfer information and/or data. For example, the collection device 120 and the processing device 110 may be different parts of the same electronic device (e.g., an earphone, glasses, etc.), and may be connected by a metal wire.

In some embodiments, the terminal 130 may be a terminal used by a user or other entities. For example, it may be a terminal used by a sound source (a person or other entities) corresponding to the target voice, or terminals used by the other users or entities who perform voice calls with the sound source (the person or the other entities) corresponding to the target voice.

In some embodiments, the terminal 130 may include a mobile device 130-1, a tablet computer 130-2, a laptop 130-3, etc., or any combination thereof. In some embodiments, the mobile device 130-1 may include an intelligent home device, a wearable device, an intelligent mobile device, a virtual reality device, an augmented reality device, etc., or any combination thereof. In some embodiments, the intelligent home device may include an intelligent lighting device, an intelligent electrical control device, an intelligent monitoring device, a smart TV, an intelligent camera, a walkie-talkie, etc., or any combination thereof. In some embodiments, the wearable device may include an intelligent bracelet, an intelligent footwear, intelligent glasses, an intelligent helmet, an intelligent watch, an intelligent headphone, an intelligent wear, an intelligent backpack, an intelligent accessory, etc., or any combination thereof. In some embodiments, the intelligent mobile device may include an intelligent phone, a personal digital assistant (PDA), a gaming device, a navigation device, a point of sale (POS), etc., or any combination thereof. In some embodiments, the virtual reality device and/or the augmented reality device may include a virtual reality helmet, virtual reality glasses, virtual reality goggles, an augmented virtual reality helmet, augmented reality glasses, augmented reality goggles, etc., or any combination thereof.

In some embodiments, the terminal 130 may obtain/receive the voice signal of the target voice, such as the first signal and the second signal. In some embodiments, the terminal 130 may obtain/receive the voice-enhanced output voice signal of the target voice. In some embodiments, the terminal 130 may directly obtain/receive the voice signal of the target voice, such as the first signal and the second signal, from the collection device 120 and the storage device 140. Alternatively, the terminal 130 may obtain/receive the voice signal such as the first signal and the second signal of the target voice, from the collection device 120 and the storage device 140 through the network 150. In some embodiments, the terminal 130 may directly obtain/receive the output voice signal of the target voice after voice enhancement from the processing device 110 and the storage device 140. Alternatively, the terminal 130 may obtain/receive the output voice signal of the target voice after voice enhancement from the processing device 110 and the storage device 140 through the network 150.

In some embodiments, the terminal 130 may send an instruction to the processing device 110, and the processing device 110 may execute the instruction from the terminal 130. For example, the terminal 130 may send to the processing device 110 one or more instructions for implementing the voice enhancement method for the target voice, so that the processing device 110 executes the one or more operations/steps of the voice enhancement method.

The storage device 140 may store the data and/or information obtained from other devices or system components. For example, the storage device 140 may store the voice signal of the target voice, such as the first signal and the second signal, and may also store the voice-enhanced output voice signal of the target voice. In some embodiments, the storage device 140 may store data obtained/acquired from the collection device 120. In some embodiments, the storage device 140 may store the data obtained/acquired from the processing device 110. In some embodiments, storage device 140 may store the data and/or the instruction for execution or use by the processing device 110 to perform the exemplary methods described herein. In some embodiments, the storage device 140 may include a mass memory, a removable memory, a volatile read-write memory, a read-only memory (ROM), etc., or any combination thereof. Exemplary mass storages may include a magnetic disk, an optical disk, a solid-state disk, etc. Exemplary removable storages may include a flash drive, a floppy disk, an optical disk, a memory card, a compact disk, a magnetic tape, etc. Exemplary volatile read-only memories may include a random-access memory (RAM). Exemplary RAMs may include a dynamic RAM (DRAM), a double rate synchronous dynamic RAM (DDR SDRAM), a static RAM (SRAM), a thyristor RAM (T-RAM), and a zero capacitance RAM (Z-RAM), etc. Exemplary ROMs may include a mask ROM (MROM), a programmable ROM (PROM), an erasable programmable ROM (PEROM), an electronically erasable programmable ROM (EEPROM), a compact disc ROM (CD-ROM), and a digital universal disk ROM, etc. In some embodiments, the storage device 140 may be implemented on a cloud platform. Merely by way of example, the cloud platform may include a private cloud, a public cloud, a hybrid cloud, a community cloud, a distributed cloud, an internal cloud, a multi-layer cloud, etc., or any combination thereof.

In some embodiments, the storage device 140 may be connected to the network 150 to communicate with one or more components of the voice enhancement system 100 (e.g., the processing device 110, the collection device 120, the terminal 130). One or more components in the voice enhancement system 100 may access data or instructions stored in the storage device 140 through the network 150. In some embodiments, the storage device 140 may be directly connected or communicated with one or more components in the voice enhancement system 100 (e.g., the processing device 110, the collection device 120, the terminal 130). In some embodiments, the storage device 140 may be a part of the processing device 110.

In some embodiments, one or more components of the voice enhancement system 100 (e.g., the processing device 110, the collection device 120, the terminal 130) may have permission to access the storage device 140. In some embodiments, one or more components of the voice enhancement system 100 may read and/or modify information related to the target voice when one or more conditions are met.

The network 150 may facilitate an exchange of information and/or data. In some embodiments, one or more components in the voice enhancement system 100 (e.g., the processing device 110, the collection device 120, the terminal 130, and the storage device 140) may send the information and/or data to/from other components in the voice enhancement system 100 through the network 150. For example, the processing device 110 may obtain/acquire the first signal and the second signal of the target voice from the collection device 120 or the storage device 140 through the network 150, and the terminal 130 may obtain/acquire the output voice signal of the target voice after voice enhancement from the processing device 110 or the storage device 140 through the network 150. In some embodiments, the network 150 may be any form of a wired or wireless network or any combination thereof. Merely by way of example, the network 150 may include a cable network, a wired network, a fiber optic network, a telecommunications network, an intranet, the Internet, a local area network (LAN), a wide area network (WAN), a wireless local area network (WLAN), a metropolitan area network (MAN), a public switched telephone network (PSTN), a Bluetooth network, a Zigbee network, a near field communication (NFC) network, a global system for mobile communications (GSM) network, a code division multiple access (CDMA) network, a time division multiple access (TDMA) network, a general packet radio service (GPRS) network, an enhanced data rates for GSM evolution (EDGE) network, a wideband code division multiple access (WCDMA) network, a high speed downlink packet access (HSDPA) network, a long term evolution (LTE) network, a user datagram protocol (UDP) network, a transmission control protocol/Internet protocol (TCP/IP) network, a short message service (SMS) network, a wireless application protocol (WAP) network, an ultra-wideband (UWB) network, infrared, etc., or any combination thereof. In some embodiments, the voice enhancement system 100 may include one or more network access points. For example, the voice enhancement system 100 may include wired or wireless network access points, such as base stations and/or wireless access points 150-1, 150-2, . . . , through which one or more components of the voice enhancement system 100 may be connected to the network 150 to exchange data and/or information.

Those skilled in the art may appreciate that when the elements or components of the voice enhancement system 100 are implemented, the components may be implemented by electrical and/or electromagnetic signals. For example, when the collection device 120 sends the first signal and the second signal of the target voice to the processing device 110, the collection device 120 may generate a coded electrical signal. The collection device 120 may then send the electrical signal to an output port. If the collection device 120 communicates with the processing device 110 through a wired network or a data transmission line, the output port may be physically connected to a cable, which further transmits the electrical signals to an input port of the collection device 120. If the collection device 120 communicates with the collection device 120 through a wireless network, the output port of the collection device 120 may be one or more antennas that convert the electrical signals into the electromagnetic signals. In the electronic device, such as the collection device 120 and/or the processing device 110, when processing the instructions, issuing the instructions, and/or performing actions, the instructions and/or actions are performed through electrical signals. For example, when the processing device 110 retrieves or stores data from a storage medium (e.g., the storage device 140), it may send an electrical signal to a read/write device of the storage medium, which may read or write structured data in the storage medium. The structured data may be transmitted to the processor in a form of electrical signals through a bus of the electronic device. Here, the electrical signal refers to one electrical signal, a series of electrical signals, and/or at least two discontinuous electrical signals.

FIG. 2 is a schematic diagram illustrating an exemplary hardware and/or software component of a computing device according to some embodiments of the present disclosure.

In some embodiments, the processing device 110 may be implemented on a computing device 200. As shown in FIG. 2, the computing device 200 may include a storage 210, a processor 220, an input/output (I/O) 230, and a communication port 240.

The storage 210 may store data/information obtained from the collection device 120, the terminal 130, the storage device 140, or any other component of the voice enhancement system 100. In some embodiments, the storage 210 may include a mass storage device, a removable storage device, a volatile read-write memory, an ROM, etc., or any combination thereof. For example, the mass storage device may include a magnetic disk, an optical disk, a solid-state drive, etc. The removable storage device may include a flash drive, a floppy disk, an optical disk, a memory card, a zip disk, and the volatile read-write memory may include an RAM. The RAM may include a DRAM, a DDR SDRAM, a SRAM, a T-RAM, and a Z-RAM. The ROM may include an MROM, a PROM, a PEROM, an EEPROM, or a CD-ROM. In some embodiments, the storage 210 may store one or more programs and/or instructions to perform the exemplary methods described in the present disclosure. For example, the storage 210 may store a program for the processing device 110 for implementing the voice enhancement method.

The processor 220 may execute a computer instruction (a program code) and perform a function of the processing device 110 in accordance with the techniques described herein. The computer instruction may include, for example, a routine, a program, an object, a component, a signal, a data structure, a procedure, a module, and a function, which performs particular functions described herein. For example, the processor 220 may process data obtained from the collection device 120, the terminal 130, the storage device 140, and/or any other component of the voice enhancement system 100. For example, the processor 220 may process a first signal and a second signal of the target voice obtained from the collection device 120 to obtain a voice-enhanced output voice signal. In some embodiments, the output voice signal may be stored in the storage device 140, the storage 210, etc. In some embodiments, the output voice signal may be output to a broadcasting device such as a speaker through the I/O 230. In some embodiments, the processor 220 may execute the instruction obtained from the terminal 130.

In some embodiments, the processor 220 may include one or more hardware processors, such as a microcontroller, a microprocessor, an RISC, an ASIC, an ASIP, a CPU, a GPU, a PPU, a microcontroller unit, a DSP, an FPGA, an ARM, a PLD, any circuit or processor capable of performing one or more functions, etc., or any combination thereof.

For purposes of illustration only, only one processor is described in the computing device 200. However, it should be noted that the computing device 200 in the present disclosure may further include a plurality of processors. Therefore, operations and/or method steps performed by one processor as described in the present disclosure may further be jointly or separately performed by the plurality of processors. For example, if in the present disclosure, the processor of the computing device 200 executes operation A and operation B at the same time, it should be understood that operation A and operation B may also be performed by two or more different processors in the computing device jointly or separately. For example, a first processor performs operation A and a second processor performs operation B, or the first processor and the second processor perform operations A and B together.

The I/O 230 may input or output signals, data, and/or information. In some embodiments, the I/O 230 may enable a user to interact with the processing device 110. In some embodiments, the I/O 230 may include an input device and an output device. Exemplary input devices may include a keyboard, a mouse, a touch screen, a microphone, etc., or combinations thereof. Exemplary output devices may include a display device, a speaker, a printer, a projector, etc., or combinations thereof. Exemplary display devices may include a liquid crystal display (LCD), a light emitting diode (LED) based display, a monitor, a flat panel display, a curved screen, a television device, a cathode ray tube (CRT), etc., or combinations thereof.

The communication port 240 may be connected with a network (e.g., the network 150) to facilitate data communication. The communication port 240 may establish a connection between the processing device 110 and the collection device 120, the terminal 130, or the storage device 140. This connection may be a wired connection, a wireless connection, or a combination of both to enable data transmission and reception. The wired connection may include an electrical cable, a fiber optic cable, a telephone line, etc., or any combination thereof. The wireless connection may include a Bluetooth, a Wi-Fi, a WiMax, a WLAN, a ZigBee, a mobile network (e.g., 3G, 4G, 5G, etc.), etc., or combinations thereof. In some embodiments, the communication port 240 may be a standardized communication port, such as an RS232, an RS485, etc. In some embodiments, the communication port 240 may be a specially designed communication port. For example, the communication port 240 may be designed according to the digital imaging and communications in medicine (DICOM) protocol.

Figure 3:
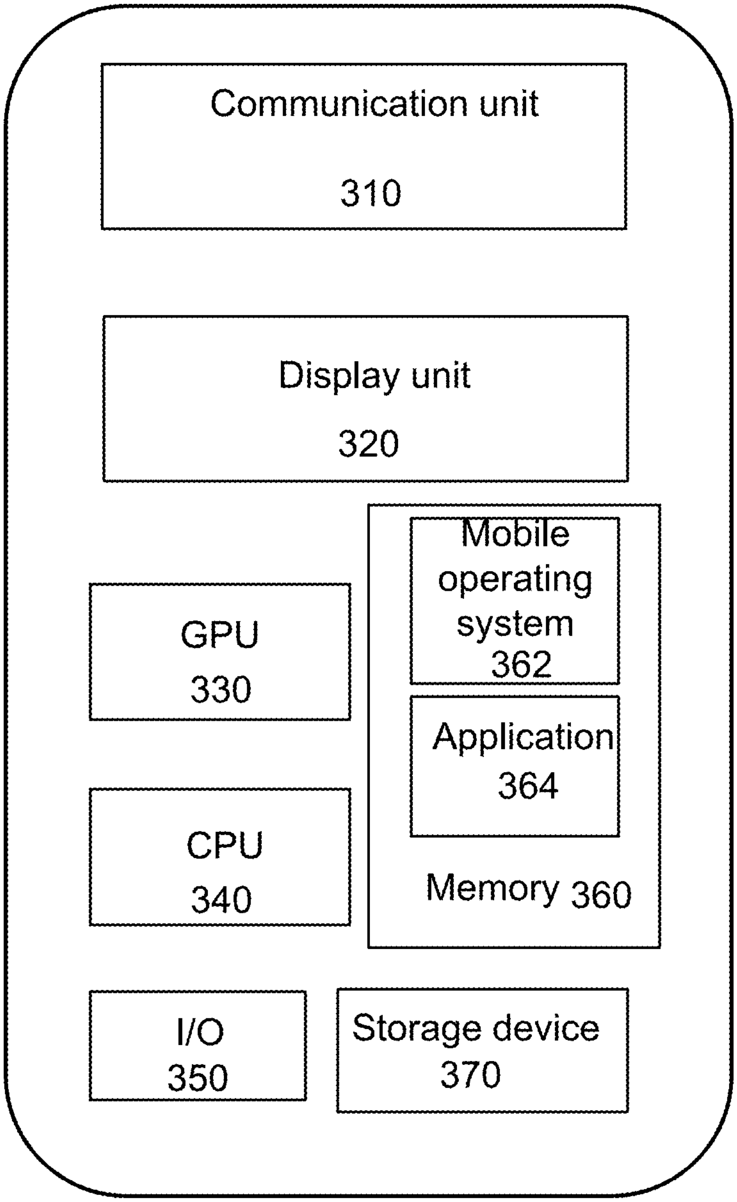
FIG. 3 is a schematic diagram illustrating exemplary hardware and/or software components of a mobile device according to some embodiments of the present disclosure.

FIG. 3 is a schematic diagram illustrating exemplary hardware and/or software components of a mobile device according to some embodiments of the present disclosure.

As shown in FIG. 3, a mobile device 300 may include a communication unit 310, a display unit 320, a GPU 330, a CPU 340, an input/output 350, a memory 360, and a storage device 370.

The CPU 340 may include an interface circuit and a processing circuit similar to the processor 220. In some embodiments, any other suitable component, including but not limited to a system bus or a controller (not shown), may also be included within the mobile device 300. In some embodiments, a mobile operating system 362 (e.g., IOS™, Andro Vehicle™, Windows Phone™, etc.) and one or more applications 364 may be loaded from the storage device 370 into the memory 360 for processing by the CPU 340. The application 364 may include a browser or any other suitable mobile application for receiving and presenting information related to the target voice and the enhanced target voice from the voice enhancement system on the mobile device 300. The interaction of signals and/or data may be implemented through the input/output device 350 and may be provided to the processing engine 112 and/or other components of the voice enhancement system 100 through the network 150.

In order to realize the aforementioned various modules, units, and their functions, a computer hardware platform may be configured as a hardware platform for the one or more elements (e.g., the modules of the processing device 110 described in FIG. 1). As these hardware elements, operation systems, and programming languages are common, it may be assumed that those skilled in the art are familiar with these techniques and that they are able to provide the information required in a route planning according to the techniques described herein. A computer with a user interface may be used as a personal computer (PC) or other types of workstations or terminal devices. When properly programmed, the computer with the user interface may be used as the processing device such as a server. It is considered that those skilled in the art may further be familiar with such structure, procedure, or general operation of this type of computer device. Therefore, no additional explanations are described with respect to the drawings.

Figure 4:
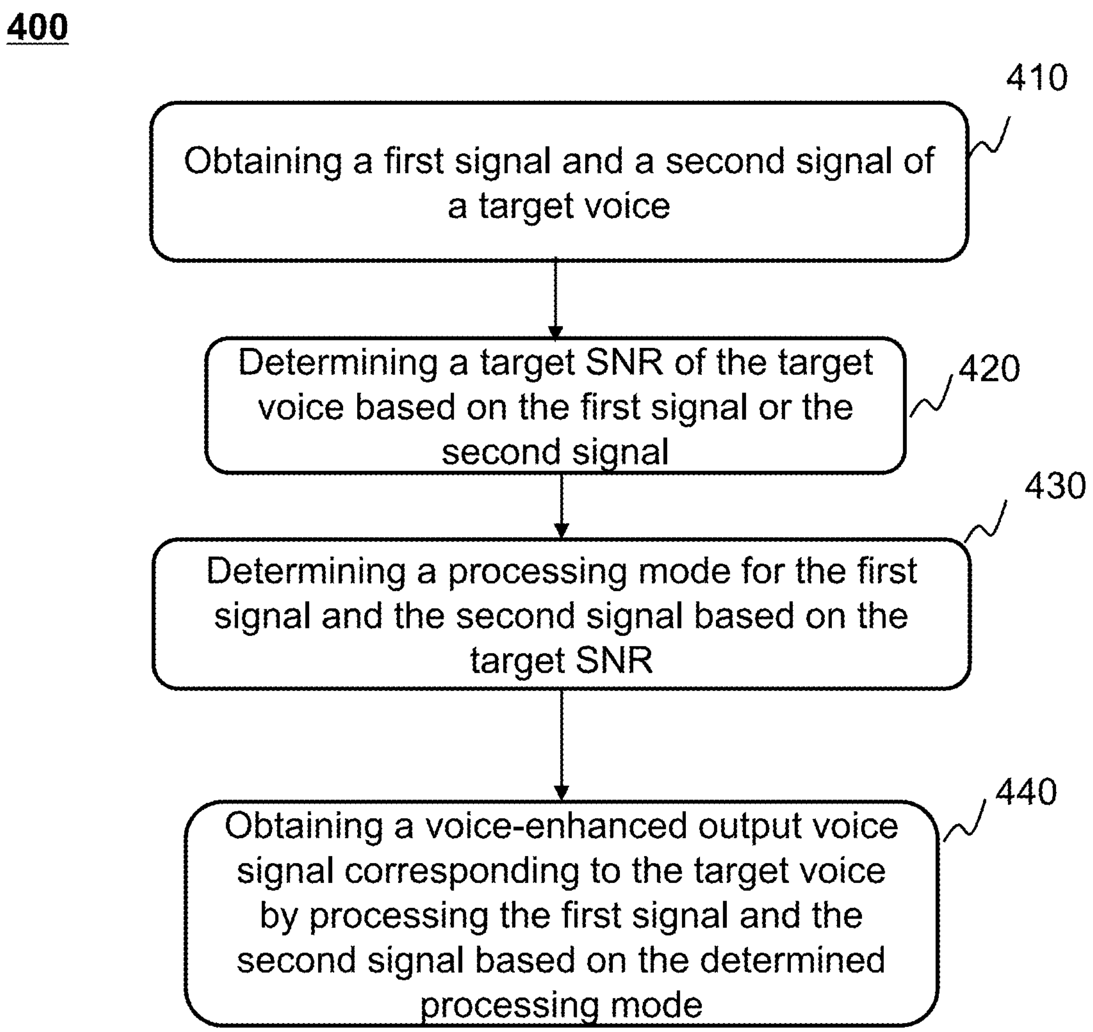
FIG. 4 is a flowchart illustrating an exemplary voice enhancement method according to some embodiments of the present disclosure.

FIG. 4 is a flowchart illustrating an exemplary voice enhancement method according to some embodiments of the present disclosure.

In some embodiments, a voice enhancement method 400 may be performed by the processing device 110, the processing engine 112, or the processor 220. For example, the voice enhancement method 400 may be stored in a storage device (e.g., the storage device 140 or a storage unit of the processing device 110) in a form of a program or an instruction. When the processing device 110, the processing engine 112, the processor 220, or the modules shown in FIG. 10 perform the program or the instruction, the voice enhancement method 400 may be implemented. In some embodiments, the voice enhancement method 400 may be implemented with one or more additional operations/steps not described below, and/or implemented without one or more operations/steps discussed below. Additionally, an order of operations/steps shown in FIG. 4 is not limiting.

As shown in FIG. 4, the voice enhancement method 400 may include the following operations.

In 410, a first signal and a second signal of a target voice may be obtained. The first signal and the second signal may be voice signals of the target voice at different voice collection positions.

Specifically, operation 410 may be performed by a first voice obtaining module 1010.

The target voice may be a voice emitted by a target sound source. The target sound source may be a user, a robot (such as an automatic answering robot, a robot that converts human input data such as a text, a gesture, etc., into a voice signal, etc.), or other creatures and devices that can send out voice information.

In some embodiments, the target voice may be doped with useless or disturbing noise, for example, a noise generated by a surrounding environment or sounds from other sound sources other than the target sound source. Exemplary noises include an additive noise, a white noise, a multiplicative noise, etc., or any combination thereof. The additive noise refers to an independent noise signal independent of the voice signal, the multiplicative noise refers to a noise signal proportional to the voice signal, and the white noise refers to a noise signal whose power spectrum is a constant.

The first signal or the second signal of the target voice refers to an electrical signal generated by the collection device after receiving the target voice, which reflects the information of a position (also called a voice collection position) of the target voice at the collection device. For the target voice, different electrical signals corresponding to the target voice may be collected by different collection devices (e.g., different microphones) at different voice collection positions. For example, the first signal and the second signal may be voice signals respectively collected by two microphones at different voice collection positions. Merely by way of example, the two different voice collection positions may be two positions with a distance of d, and the two positions have different distances from the target sound source (such as a user's mouth). The distance d may be set by the user according to actual needs, for example, in a specific scene, d may be set to no less than 0.5 cm, or no less than 1 cm.

It may be understood that a difference between the first signal and the second signal depends on an intensity, a signal amplitude, and a phase difference, etc., of the target voice at different voice collection positions.

In some embodiments, the first signal and the second signal may be obtained by collecting the target voice in real time by two collection devices, for example, by collecting a voice of a user in real time by two microphones. Alternatively, the first signal and the second signal may correspond to a piece of historical voice information, which may be obtained by reading from a storage space storing the historical voice information.

In 420, a target signal to noise ratio (SNR) of the target voice may be determined based on the first signal or the second signal.

Specifically, operation 420 may be performed by an SNR determination module 1020.

A signal to noise ratio refers to a ratio of a voice signal energy to a noise signal energy, which is called the SNR or S/N. A signal energy may be a signal power, or other energy data obtained based on the signal power. Generally speaking, the greater the SNR, the smaller the noise mixed in the target voice.

In some embodiments, the target SNR of the target voice may be a ratio of the energy of a pure voice signal (that is, a voice signal without noise) to the energy of a noise signal, or a ratio of the energy of the voice signal containing noise to the noise signal energy.

In some embodiments, the target SNR may be determined based on any one of the first signal and the second signal. For example, an SNR may be calculated based on the signal data of the first signal and used as the target SNR, or an SNR may be calculated based on the signal data of the second signal and used as the target SNR. In some embodiments, the target SNR may further be determined based on the first signal and the second signal. For example, a first SNR may be calculated based on the signal data of the first signal, and a second SNR may be calculated based on the signal data of the second signal. A final SNR may be determined as the target SNR based on the first SNR and the second SNR. Determining the final SNR based on the first SNR and the second SNR may include averaging the first SNR and the second SNR, performing a weighted summation on the first SNR and the second SNR, etc.

In some embodiments, the determination of an SNR based on signal data may be determined using an SNR estimation algorithm. For example, a noise signal value may be calculated by using a noise estimation algorithm such as a minimum value tracking algorithm and a time recursive averaging algorithm (MCRA), etc., and then the SNR may be obtained based on an original signal value and the noise signal value. In some embodiments, an SNR estimation model obtained through training may further be used to determine the SNR of the signal data.

In some embodiments, the SNR estimation model may include, but is not limited to, a multi-layer perception (MLP), a decision tree (DT), a deep neural network (DNN), a support vector machine (SVM), K-nearest neighbor algorithm (KNN), etc., and any other algorithm or model that is able to perform a feature extraction and/or classification.

In some embodiments, the SNR estimation model may be obtained by using training samples to train an initial model. A training sample may include a voice signal sample (e.g., at least one obtained historical voice signal, a useless or disturbing noise mixed in the historical voice signal) and a label value of the voice signal sample (e.g., a target SNR of a historical voice signal v1 is 0.5, and a target SNR of a historical voice signal v2 is 0.6). The voice signal sample may be processed by the model to obtain a predicted target SNR. A loss function may be constructed based on the predicted target SNR and the label value of the corresponding training sample, and model parameter(s) may be adjusted based on the loss function to reduce a difference between the predicted target SNR and the label value. For example, the model parameter(s) update or adjustment may be performed based on a gradient descent method, etc. A plurality of rounds of iterative training may be performed in this way, and when the trained model satisfies a preset condition, the training ends, and a trained SNR estimation model is obtained. The preset condition may be that the result of the loss function converges or is smaller than a preset threshold, etc.

Considering that the target voice and the noise in the target voice may change with time, the target SNR in the present disclosure may be understood as an SNR of the target voice at a specific time or within a time period. For the convenience of description, the target voice may be regarded as being composed of continuous multi-frames of voice, and each frame of voice corresponds to a frame of data in the first signal and the second signal respectively. In some embodiments, when processing the first signal and the second signal of the target voice, one or more frames of data of the signal may be processed. At a certain moment, the target SNR of the target voice is the SNR corresponding to the frame of data (that is, current frame data) of the first signal and/or the second signal at that moment.

In some embodiments, the target SNR of the target voice may be determined based on the current frame data of the first signal and/or the second signal. Alternatively, the target SNR of the target voice may be determined based on one or more frames of data before the current frame data of the first signal and/or the second signal. Alternatively, the target SNR of the target voice may be jointly determined based on the current frame data of the first signal and/or the second signal and at least one frame data before the current frame data. It should be known that the frame data used for determining the target SNR mentioned here may be original frame data in the first signal and/or the second signal, or the frame data after voice enhancement. For example, when calculating the target SNR corresponding to the current frame data, the SNR determination module may combine the current frame data in the first signal and/or the second signal that has not undergone the voice enhancement and one or more previous voice-enhanced frame data to determine the target SNR.

For the purpose of illustration, the target SNR corresponding to the target voice at the current moment may be determined in the following mode: respectively obtaining the current frame data of the first signal and the second signal; determining estimated SNR corresponding to the current frame data of the first signal and the second signal; determining, based on frame data of at least one of the first signal and the second signal before the current frame data, a verification SNR of the target voice; and determining the target SNR corresponding to the current frame data of the first signal and the second signal based on the verification SNR and the estimated SNR.

The estimated SNR refers to the SNR calculated based on the current frame data of the first signal and/or the second signal. For the signal Y of the current frame, the noise N of which may be estimated, and the estimated SNR can be calculated as:

$$\xi_0=Y/N-1. \quad (1)$$

In some embodiments, the estimated SNR of the current frame data may further be jointly calculated based on the current frame data of the first signal and/or the second signal and a plurality of frames of data before the current frame data. For example, a plurality of estimated SNR of the plurality of frames of data may be respectively calculated based on the current frame data (nth frame) of the first signal and/or the second signal, the plurality of frame data before the current frame data (k frames of data before the nth frame, that is, from the (n−1)th frame to the (n−k)th frame), and then an average calculation, a weighted summation, and a smoothing may be performed on the plurality of estimated SNR to obtain a final SNR, which is used as the estimated SNR $\xi_0$ of the current frame data.

The verification SNR refers to the SNR calculated based on at least one denoised frame data of the first signal and/or the second signal before the current frame data (that is, a voice-enhanced output voice signal corresponding to the frame data before the current frame data). For example, based on the denoised frame data of the first signal and/or the second signal before the current frame data, an SNR may be calculated as the verification SNR. For the signal Y of the previous frame, it is equal to a sum of a clean signal X (such as the denoised frame data) and the noise signal N. The verification SNR $\xi_1$ calculated based on the denoised frame data before the current frame data may be determined as follows:

$$\xi_1=Y/(Y-X). \quad (2)$$

As another example, a plurality of verification SNRs may further be calculated based on the plurality of frames of data before the current frame data of the first signal and/or the second signal. In some embodiments, a final SNR may be determined based on the plurality of verification SNRs and the estimated SNR, and used as the target SNR. Taking the calculation of the verification SNR $\xi_1$ based on frame data of two frames before the current frame data (nth frame) of the first signal and/or the second signal as an example, the verification SNR $\xi_1$ may be determined as follows:

$$\xi_1=a\xi_1(n)+(1-a)\xi_1(n-1), \quad (3)$$

where, $\xi_1(n)$ indicates the verification SNR calculated based on the previous frame data of the nth frame (that is, the (n−1)th frame), $\xi_1(n-1)$ indicates the verification SNR calculated based on the previous frame data of the (n−1)th frame (that is, the (n−2)th frame).

Alternatively, the verification SNR $\xi_1$ may be determined as follows:

$$\xi_1=\max(\xi_1(n),a\xi_1(n-1)), \quad (4)$$

where, a indicates a weight coefficient, which is set according to experience or actual needs.

In some embodiments, the plurality of verification SNRs may be averaged, weighted, and summed to obtain a final SNR, and the final SNR may be used as the verification SNR of the current frame signal. In some embodiments, the verification SNR may be used together with the estimated SNR to determine the target SNR. In some embodiments, the verification SNR or the estimated SNR may be used alone to determine the target SNR.

In some embodiments, the determining the target SNR corresponding to the current frame data of the first signal and the second signal based on the verification SNR(s) and the estimated SNR may be averaging, weighting, and summarizing the verification SNR (it may be a plurality of verification SNRs) and the estimated SNR to obtain a final SNR, and taking the final SNR as the target SNR corresponding to the current frame data. For example, the verification SNR $\xi_1$ and the estimated SNR $\xi_0$ may be obtained, and the target SNR $\xi$ may be determined as follows:

$$\xi=c\xi_0+(1-c)\xi_1, \quad (5)$$

where, c indicates the weight coefficient, which is set according to experience or actual needs.

In 430, a processing mode for the first signal and the second signal may be determined based on the target SNR.

Specifically, operation 430 may be performed by an SNR discrimination module 1030.

The processing of the first signal and the second signal mentioned here may be understood as a process of eliminating the noise mixed in the target voice. When the amount of noise doped in the target voice is different, that is, the target SNR is different, and the mode to eliminate the noise may be different. In some embodiments, the determining the processing mode for the first signal and the second signal based on the target SNR includes: in response to that the target SNR is smaller than a first threshold, processing the first signal and the second signal in a first mode; and in response to that the target SNR is greater than a second threshold, processing the first signal and the second signal in a second mode. The first mode and the second mode are different processing modes. In some embodiments, the first mode and the second mode consume different amounts of computing resources. For example, compared with the second mode, the processing device 110 allocates more memory resources to the first mode, so as to improve a processing speed of signals with low SNR.

The first threshold and the second threshold may be constant values. In some embodiments, the first threshold may be equal to the second threshold. In some embodiments, the first threshold may be smaller than the second threshold (e.g., the first threshold may be −5 dB and the second threshold may be 10 dB). When the first threshold is smaller than the second threshold, selecting the processing mode based on the target SNR may avoid continuously switching the processing mode due to the target SNR changing in a small range around the first threshold or the second threshold, thereby enhancing a signal processing stability. In some embodiments, the first threshold is smaller than the second threshold, and a difference between the second threshold and the first threshold is not less than 3 dB, 4 dB, 5 dB, 8 dB, 10 dB, 15 dB, or 20 dB. In some embodiments, the first threshold and the second threshold may be adjusted by the user or by the voice enhancement system 100. For example, when the first threshold and the second threshold are adjusted to be much higher than a possible value of the target SNR, the voice enhancement system 100 may always process the signal in the first mode. Similarly, when the first threshold and the second threshold are adjusted to be much lower than the possible value of the target SNR, the voice enhancement system 100 may always process the signal in the second mode.

In some embodiments, in response to that the target SNR is smaller than the first threshold, the first mode and the second mode are used to process the first signal and the second signal according to a preset first ratio; and in response to that the target SNR is greater than the second threshold, the first mode and the second mode are used to process the first signal and the second signal according to a preset second ratio. The processing of the first signal and the second signal according to a preset ratio (the first ratio or the second ratio) in the first mode and the second mode refers to dividing the first signal and the second signal according to the ratio (the first ratio or the second ratio), and processing the divided signals in different parts by the corresponding processing mode (e.g., a first part of the signal is processed in the first mode, and a second part of the signal is processed in the second mode). Dividing the first signal and the second signal according to the ratio may be achieved by dividing the signal according to the ratio based on signal frequency, time coordinate of the signal, etc. In some embodiments, the first ratio may correspond to more signal portions processed by the first mode than by the second mode, and the second ratio may correspond to more signal portions processed by the second mode than by the first mode.

In 440, by processing the first signal and the second signal based on the determined processing mode, a voice-enhanced output voice signal corresponding to the target voice may be obtained.

Specifically, operation 440 may be performed by a first enhancement processing module 1040.

After the first signal and the second signal are processed based on the determined processing mode, the voice enhancement of the target voice may be achieved. The voice enhancement includes effects such as the noise reduction, the voice signal enhancement, etc., and the voice signal obtained after the processing is the voice-enhanced output voice signal corresponding to the target voice.

In some embodiments, the first mode may include employing one or more modes of a delay-sum beamforming (delay-sum), an adaptive null-forming (ANF), a minimum variance distortion-free response beamforming (MVDR), a generalized sidelobe canceller (GSC), a differential spectrum subtraction, etc., to process the first signal and the second signal. The first signal and the second signal may be processed on a time domain (e.g., processing on the time domain using the ANF mode), or the first signal and the second signal may be processed on a frequency domain (e.g., processing on the frequency domain using the modes like the ANF, the delay-sum, the MVDR, the GSC, and the differential spectrum subtraction, etc.).

Taking the first mode is processing the first signal and the second signal by using the ANF mode as an example: the first signal (indicated as x(n)) is the voice signal obtained by the collection device located close to the target sound source, and the second signal (indicated as y(n)) is the voice signal obtained by another collection device, and the proportions of the voice signal and the noise signal in x(n) and y(n) are different. For the convenience of understanding, x(n) may be regarded as mainly including the voice signal, y(n) may be regarded as mainly including the noise signal, and the difference between x(n) and y(n) in the time domain or the frequency domain is used for a two-way signal processing. In this way, the noise in the target voice may be eliminated.

In some embodiments, the second mode may use one or more modes of a beamforming mode (such as the ANF, the GSC, the MVDR, etc.), a spectral subtraction mode, an adaptive filtering mode, etc., to process the first signal and the second signal.

Taking the second mode using the ANF beamforming mode to process the first signal and the second signal as an example, by constructing a differential output signal $x_s$ of the first signal and the second signal with poles in a target voice direction, constructing a differential output signal $x_n$ of the first signal and the second signal with poles in an opposite direction and a null point in the target voice direction, and using the principle of adaptive filtering to perform a differential operation on the $x_s$ and the $x_n$, the voice-enhanced output voice signal corresponding to the target voice may be obtained. By using the ANF beamforming mode, when an angle difference between the voice signal and the noise is great, the noise may be effectively filtered. In some embodiments, after the first signal and the second signal are processed by the ANF beamforming mode, a further noise filtering may be performed on the obtained signal data by using a post-filtering algorithm of distribution probability, thereby more effectively suppressing the noise in the direction near the target voice.

In some embodiments, in the first mode, different processing techniques may be used for a low frequency part and a high frequency part of the first signal and the second signal respectively. The low frequency, the high frequency, etc., mentioned here only represent an approximate range of frequency, and in different application scenarios, there may be different division modes. For example, a frequency division point may be determined. The low frequency may represent a frequency range below the frequency division point, and the high frequency may represent frequencies above the frequency division point. The frequency division point may be any value within an audible range of human ears, for example, 200 Hz, 500 Hz, 600 Hz, 700 Hz, 800 Hz, 1000 Hz, etc.

It can be understood that, for the low frequency part, a difference in voice signal intensity (such as a signal amplitude) between the first signal and the second signal is relatively large and a difference in phase is relatively small. In some embodiments, the low frequency parts of the first signal and the second signal may be processed based on frequency domain information (e.g., the magnitude). For the high frequency part, the phase difference of the voice signal between the first signal and the second signal may be more prominent and the difference in intensity is smaller. In some embodiments, the high frequency parts of the first signal and the second signal may be processed based on the time domain information (the time domain signal embodies the phase information of the signal). By adopting different processing modes for the high frequency part and the low frequency part, the noise of the low frequency part and the high frequency part of the target voice may be effectively eliminated respectively, thereby improving the voice enhancement effect of the target voice.

In some embodiments, using the first mode to process the first signal and the second signal may include: obtaining a first output voice signal with a low frequency part of the target voice enhanced by processing the low frequency part of the first signal and the low frequency part of the second signal using a first processing technique; and obtaining a second output voice signal with the high frequency part of the target voice enhanced by processing the high frequency part of the first signal and the high frequency part of the second signal using a second processing technique.

In some embodiments, the first output voice signal and the second output voice signal may be combined to obtain an output voice signal corresponding to the target voice. For more details about processing the first signal and the second signal in the first mode, please refer to FIG. 5, FIG. 6, and their related contents, which are not repeated here.

In some embodiments, after the output voice signal of the target voice is obtained, the output voice signal may further be post-filtered, and the post-filtering process may be performed using modes such as the MCRA and a multi-McWina filter (MCWF), so as to achieve a further filtering of the residual steady-state noise.

Figure 5:
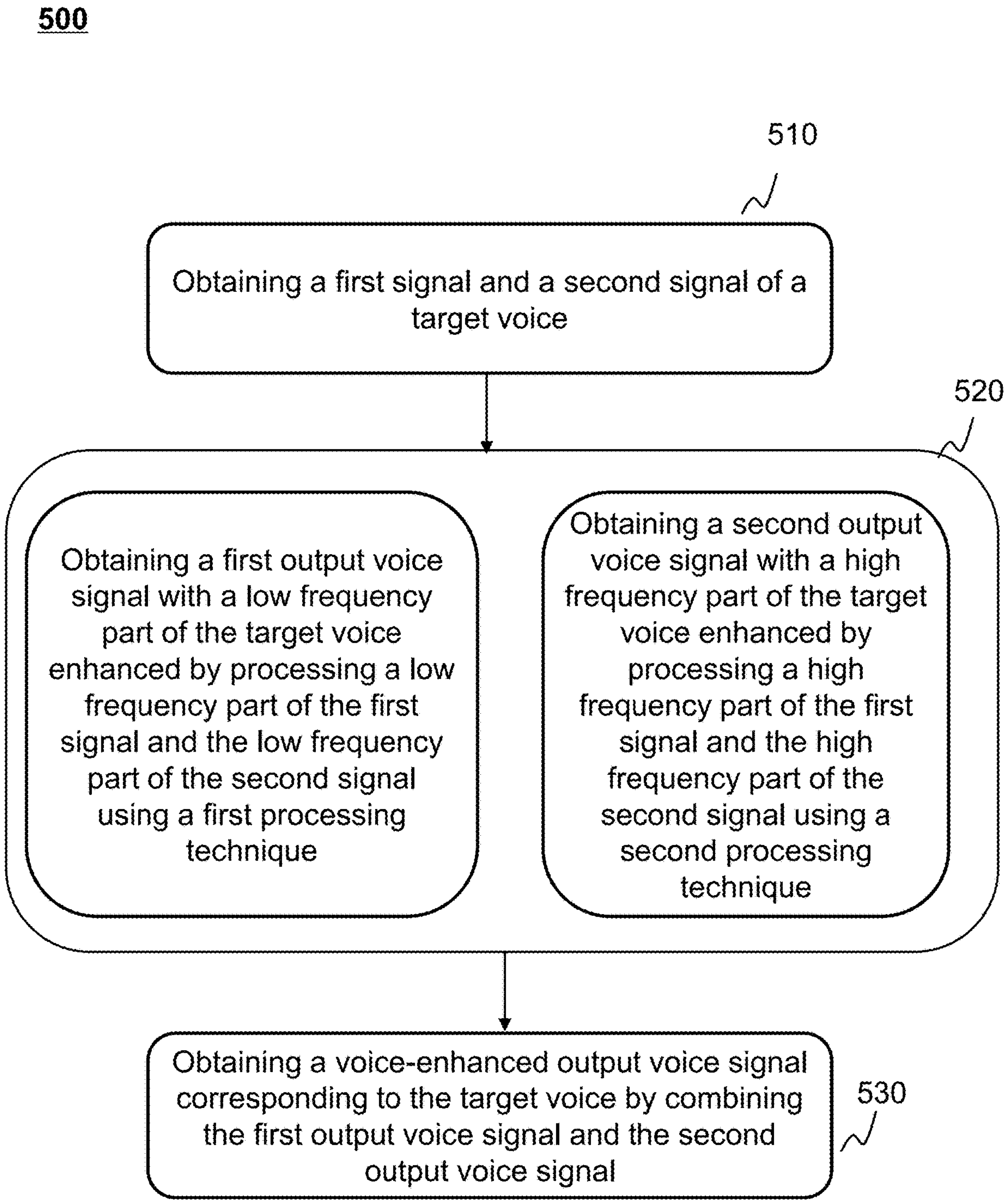
FIG. 5 is a flowchart illustrating another exemplary voice enhancement method according to some embodiments of the present disclosure.

FIG. 5 is a flowchart illustrating another exemplary voice enhancement method according to some embodiments of the present disclosure.

In some embodiments, a method 500 may be performed by the processing device 110, the processing engine 112, or the processor 220. For example, the method 500 may be stored in a storage device (e.g., a storage unit of the storage device 140 or the processing device 110) in a form of a program or an instruction. When the processing device 110, the processing engine 112, the processor 220, or the modules shown in FIG. 11 perform the program and the instruction, the method 500 may be implemented. In some embodiments, the method 500 may be accomplished with one or more additional operations/steps not described below, and/or without one or more operations/steps discussed below. Additionally, an order of operations/steps shown in FIG. 5 is not limiting.

As shown in FIG. 5, the method 500 may include the following operations.

In 510, a first signal and a second signal of a target voice may be obtained. The first signal and the second signal may be voice signals of the target voice at different voice collection positions.

Specifically, operation 510 may be performed by a second voice obtaining module 1110.

For more information about obtaining the first signal and the second signal of the target voice, please refer to operation 410 in FIG. 4 and the related descriptions, and the details are not repeated here.

In 520, by processing a low frequency part of the first signal and the low frequency part of the second signal using a first processing technique, a first output voice signal with the low frequency part of the target voice enhanced may be obtained; and by processing a high frequency part of the first signal and the high frequency part of the second signal using a second processing technique, a second output voice signal with the high frequency part of the target voice enhanced may be obtained.

Specifically, operation 520 may be performed by a second enhancement processing module 1120.

As mentioned above, in the first mode, different processing techniques may be used to process the low frequency part and the high frequency part of the first signal and the second signal respectively. In some embodiments, the first processing technique may be used to process the low frequency part of the first signal and the low frequency part of the second signal, and the second processing technique may be used to process the high frequency part of the first signal and the high frequency part of the second signal.

Figure 6:
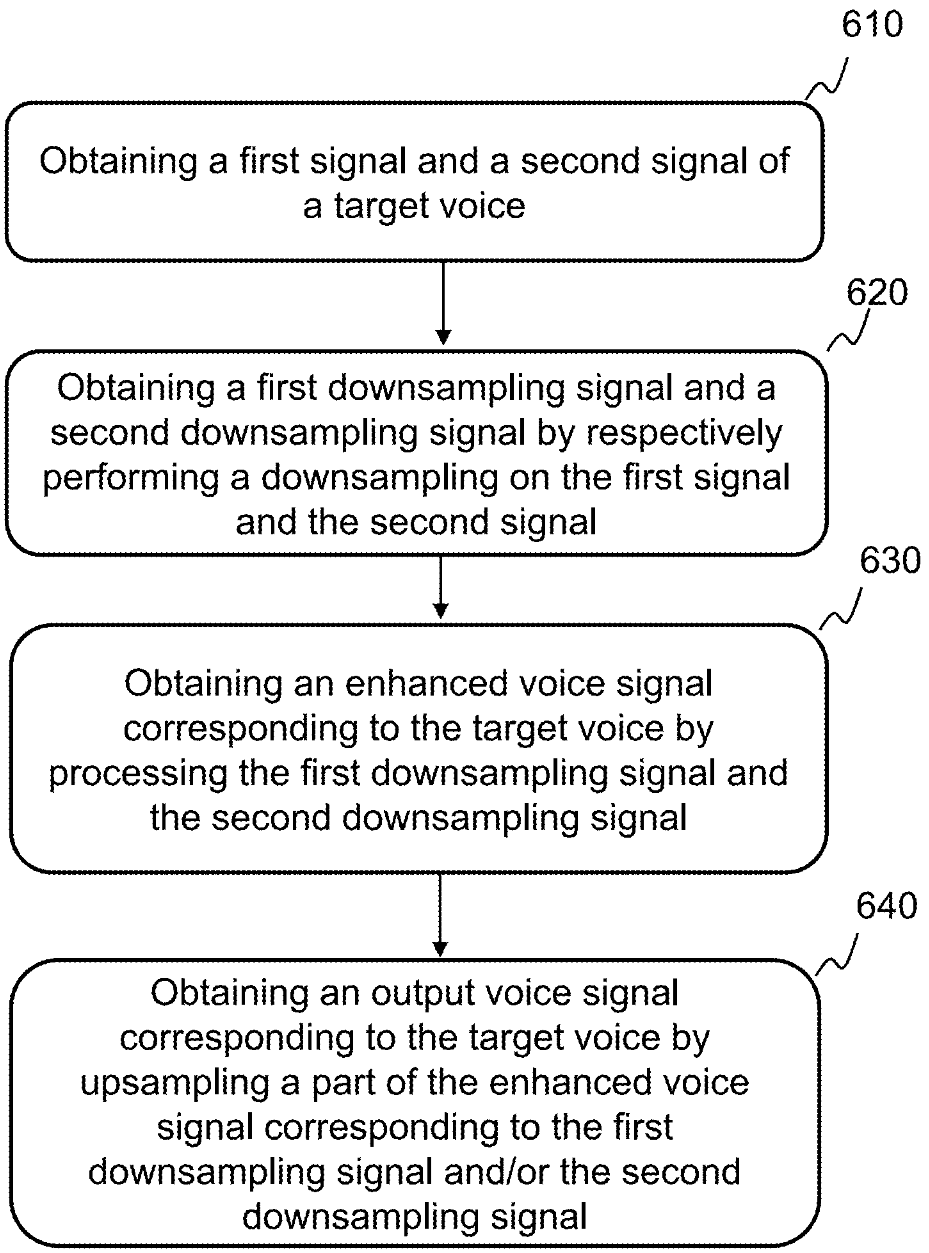
FIG. 6 is a flowchart illustrating another exemplary voice enhancement method according to some embodiments of the present disclosure.

In some embodiments, the using the first processing technique to process the low frequency part of the first signal and the low frequency part of the second signal may be performed according to the method shown in FIG. 6, and the description of the method may be found in FIG. 6 and its related contents.

Figure 7:
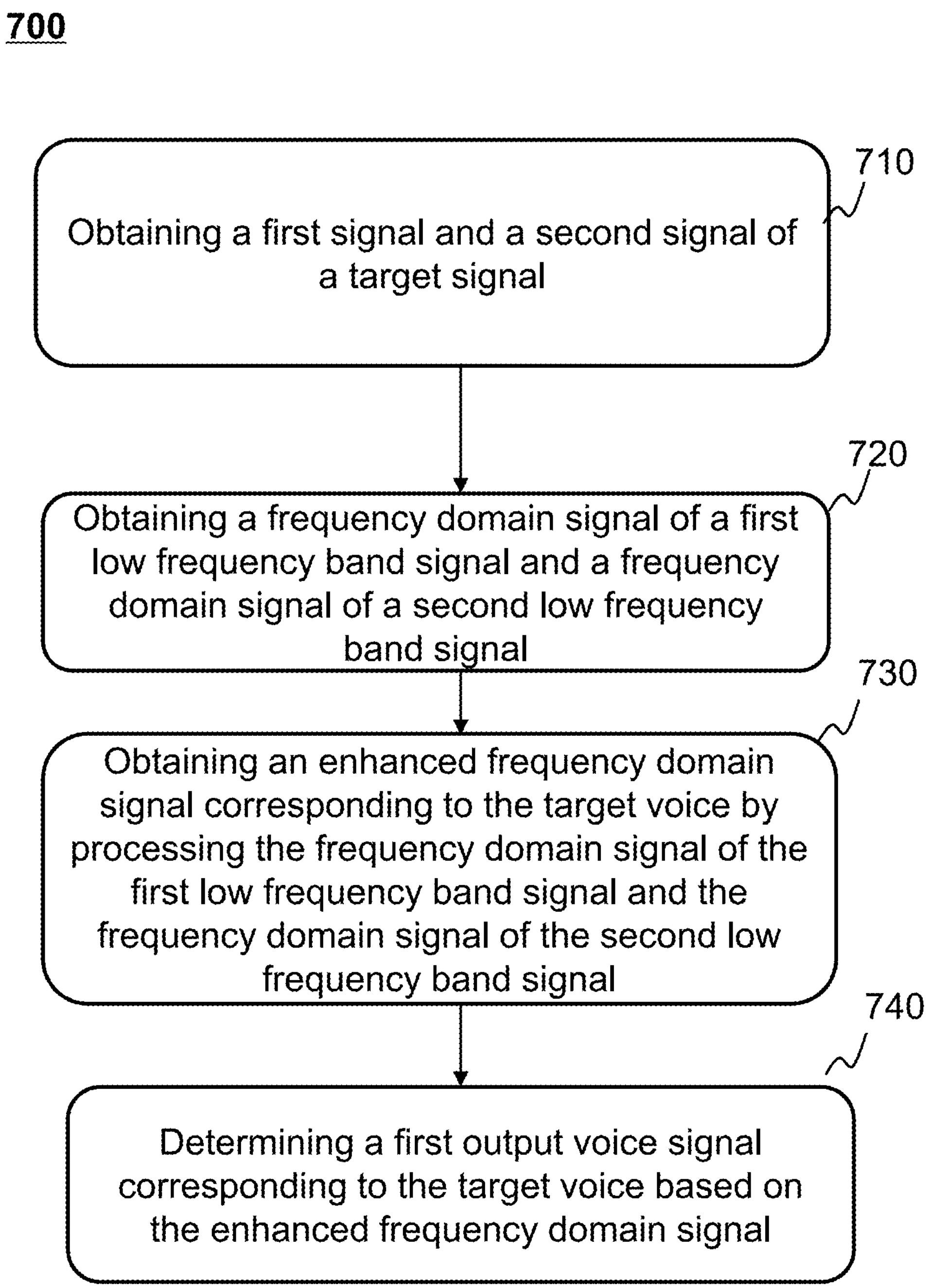
FIG. 7 is a flowchart illustrating an exemplary first processing technique according to some embodiments of the present disclosure.

In some embodiments, by processing the low frequency part of the first signal and the low frequency part of the second signal using the first processing technique to obtain the first output voice signal with the low frequency part of the target voice enhanced may be performed using the method shown in FIG. 7. For the description of the method, please refer to FIG. 7 and its related contents.

In some embodiments, the second processing technique may be one or more of the aforementioned processing modes such a delay-sum, an ANF, an MVDR, a GSC, a differential spectral subtraction, etc.

In some embodiments, the second processing technique may include: obtaining a first high frequency band signal corresponding to the high frequency part of the first signal, and a second high frequency band signal corresponding to the high frequency part of the second signal; and performing a differential operation based on the first high frequency band signal and the second high frequency band signal to obtain the second output voice signal with the high frequency part of the target voice enhanced.

In some embodiments, the high frequency part of the signal may be obtained by a high pass filtering or other techniques. For example, the first signal and the second signal are subjected to the high pass filtering whose cutoff frequency is a specific frequency, and parts of the first signal and the second signal whose signal frequency is greater than or equal to the specific frequency are obtained as the first high frequency band of the first signal and the second high frequency band signal of the second signal.

The second output voice signal refers to a voice signal obtained after the high frequency part of the target voice is enhanced by processing the first high frequency band signal and the second high frequency band signal.

The performing the differential operation based on the first high frequency band signal and the second high frequency band signal may be performing various differential calculation techniques for calculating a signal difference value between the first high frequency band signal and the second high frequency band signal, such as an adaptive differential operation technique. By performing the differential operation on the first high frequency band signal and the second high frequency band signal, the noise signal may be eliminated, and the voice signal may be enhanced.

When performing the voice enhancement processing on the voice signal, considering actual processing requirements and processing efficiency, the voice enhancement processing is performed based on the signal after sampling. Before performing the differential operation based on the first high frequency band signal and the second high frequency band signal, the first high frequency band signal and the second high frequency band signal may be sampled, and the subsequent differential operation processing may be performed based on the sampled first high frequency band signal and the sampled second high frequency band signal. Alternatively, the sampling operation may be performed when the first signal and the second signal are obtained, or the high frequency part of the first signal and the high frequency part of the second signal are obtained. Then the obtained first high frequency band signal and the second high frequency band signal may be the signals after sampling.

In some embodiments, the performing the differential operation on the first high frequency band signal and the second high frequency band signal may include: upsampling the first high frequency band signal and the second high frequency band signal, respectively, to obtain the first high frequency band signal and the second high frequency band signal after upsampling, i.e., the first upsampling signal and the second upsampling signal. By performing the differential operation on the first upsampling signal and the second upsampling signal, the second output voice signal with the high frequency part of the target voice enhanced may be obtained.

The upsampling refers to interpolating and supplementing an original signal, and a result obtained is equivalent to a signal obtained by sampling the original signal using an increased sampling frequency. The interpolating and supplementing refer to inserting several signal points with fixed signal values (such as 0) between the signal points of the original signal. In some embodiments, an upsampling multiple of the upsampling, that is, a ratio of a sampling frequency of the signal after upsampling to a sampling frequency of the original signal, may be set according to experience or actual needs. For example, the first signal and the second signal may be upsampled by 5 times, that is, the sampling frequency of the first signal and the second signal after upsampling is 5 times the sampling frequency of the original first high frequency band signal and the original second high frequency band signal.

In some embodiments, when sampling the first high frequency band signal and the second high frequency band signal, the aforementioned upsampling process may be replaced by sampling with a specific sampling frequency to obtain the first high frequency band signal corresponding to the high frequency part of the first signal, as well as the second high frequency band signal corresponding to the high frequency part of the second signal. Further, the differential operation is performed on the sampled signals to obtain a second output voice signal with the high frequency part of the target voice enhanced.

The specific sampling frequency may be determined according to a position corresponding to the first signal and the second signal. For example, the sampling frequency of the sampling is indicated by fs, and due to a difference between the voice collection positions of the first signal and the second signal, a time delay t exists between the first signal and the second signal can be represented as follows:

$$t=d/c, \tag{6}$$

where, d indicates a distance between the voice collection positions corresponding to the first signal and the second signal.

When sampling, a time difference t1 between two sampling points is 1/fs. If the time difference t1 between the two sampling points is greater than the time delay t of the signals, the time delay between the first signal and the second signal is included in one sampling period, and in one sampling period, an aliasing may occur between the first signal and the second signal. As a result, the differential operation may not be performed on the sampled first signal and the sampled second signal. Therefore, the sampling frequency may be made to satisfy a condition that t1 is less than or equal to t, that is, 1/fs is less than or equal to d/c. Further, the sampling frequency may further satisfy the condition that t1 is less than or equal to a value smaller than t, that is, 1/fs is less than or equal to a value smaller than (d/c). For example, the sampling frequency may also satisfy the condition that t1 is less than or equal to ½t, that is, 1/fs is less than or equal to ½(d/c). Further, the sampling frequency may also satisfy the condition that t1 is less than or equal to ⅓t, that is, 1/fs is less than or equal to ⅓(d/c). Further, the sampling frequency may also satisfy the condition that t1 is less than or equal to ¼t, that is, 1/fs is less than or equal to ¼(d/c).

In some embodiments, the performing the differential operation on the first high frequency band signal and the second high frequency band signal may include: performing the differential operation based on a first timing signal of the first high frequency band signal (or the first upsampling signal), at least one timing signal of the second high frequency band signal (or the second upsampling signal) before the timing of the first timing signal; and obtaining the second output voice signal with the high frequency part of the target voice enhanced.

The timing signal refers to a frame signal or a signal per other time-unit. The first timing signal refers to a timing signal currently being processed (such as the current frame data). The at least one timing signal before the timing of the first timing signal refers to a timing signal of at least one time point before the timing signal currently being processed. For example, the first timing signal is the frame data of the kth frame, and the at least one timing signal before the first timing signal is the frame data of the (k−1)th frame, i is an integer greater than 0.

The differential operation may include: calculating a difference between signal data of the current frames (such as the nth frames) in the first high frequency band signal and the second high frequency band signal. For example, fm(n) indicates the nth frame signal of the first high frequency band signal, rm(n) represents the nth frame signal of the second high frequency band signal, and the differential operation may include:

$$\text{output}(n)=fm(n)-rm(n), \tag{7}$$

where, output(n) indicates output signal data obtained by the differential operation.

The differential operation may include: combining at least one timing signal of the second high frequency band signal before the timing of the first timing signal to obtain signal data, and calculating the difference between the signal data and the first timing signal of the first high frequency band signal. Taking the timing signals before the three first timing signals where i is 1, 2, and 3 as an example, fm is a signal representation of the first high frequency band signal, rm is a signal representation of the second high frequency band signal, and the differential operation may include calculating the difference between the first timing signal (i.e., the kth frame signal fm(k) of the first high frequency band signal) and signal data after combining the (k−1)th frame signal rm(k−1), the (k−2)th frame signal rm(k−2), and the (k−3)th frame signal rm(k−3) of the second high frequency band signal. The combination here may be a weighted summation of each signal.

In some embodiments, in the at least one timing signal before the timing of the first timing signal, each timing signal corresponds to a weight coefficient which is called a second weight coefficient. The differential operation may be performed based on the first timing signal of the first high frequency band signal, the at least one timing signal of the second high frequency band signal before the timing of the first timing signal, and a second weight coefficient corresponding to the at least one timing signal. For example, the least one timing signal before the timing of the first timing signal may be weighted and summed based on the second weight coefficient corresponding to each timing signal to obtain signal data, and a difference between the signal data and the first timing signal may be obtained. The second weight coefficient may be set according to experience or actual needs.

For example, the at least one timing signal of the second high frequency band signal before the timing of the first timing signal corresponding to the first timing signal fm(k) of the first high frequency band signal is rm(k−1), rm(k−2), rm(k−3), . . . rm(k−i), then:

$$\text{output}(k) = fm(k) - \sum_{i=0}^{i=n} rm(k-i)w_i, \tag{8}$$

where, output(k) indicates the output signal data obtained by the differential operation, n is an integer greater than 0 and less than k, and $w_i$ indicates the (k−i)th frame signal, that is, the second weight coefficient corresponding to rm(k−i).

In some embodiments, in the at least one timing signal before the timing of the first timing signal, the second weight coefficient corresponding to each timing signal may be determined according to the currently processed timing signal (i.e., the first timing signal). If the first timing signals are different, the corresponding second weight coefficients of the at least one timing signal before the timing of the first timing signal are different.

In some embodiments, the second weight coefficient corresponding to the first timing signal (such as the current frame data) may further be determined according to the second weight coefficient corresponding to one timing signal before the first timing signal (frame data of the previous frame before the current frame) in the first high frequency band signal.

For example, the first timing signal of the first high frequency band signal is the kth frame signal, expressed as fm(k), and the second weight coefficients of at least i timing signals before the kth frame signal of the second high frequency band signal is $w_i(k)$, the previous timing signal (i.e., the (k−1)th frame signal) of the first timing signal fm(k) in the first high frequency band signal is fm(k−1), and the second weight coefficients of at least i timing signals before the (k−i)th frame signal in the second high frequency band signal is $w_i(k-1)$.

The at least i timing signals of the second high frequency band signal before the timing of the first timing signal corresponding to the first timing signal (i.e., the kth frame signal fm(k)) of the first high frequency band signal are rm(k−1), rm (k−2), rm(k−3), . . . , rm(k−i), which can form a signal matrix, that is, [rm(k−1), rm(k−2), rm(k−3), . . . , rm(k−i)], then the second weight coefficient wi corresponding to fm(k) can be determined as:

$$w_i = w_i(k-1) + A*\text{output}(k-1)*[rm(k-1), rm(k-2), rm(k-3), \ldots, rm(k-i)]/B, \tag{9}$$

wherein, the previous timing signal fm(k−1) is subjected to the aforementioned differential operation processing, and an output signal obtained is output(k−1). A may be set according to experience or actual needs, for example, A may be a step size of the signal. B may be set according to experience or actual needs, for example, B may be an energy mean square of at least i timing signals rm(k−1), rm(k−2), rm(k−3), . . . , rm(ki) before the timing of the first timing signal.

In some embodiments, the second weight coefficients smaller than a preset parameter may be updated. For example, if a value of a second weight coefficient is less than 0, the second weight coefficient is set to 0.

In 530, a voice-enhanced output voice signal corresponding to the target voice may be obtained by combining the first output voice signal and the second output voice signal.

Specifically, operation 530 may be performed by a second processing output module 1130.

In some embodiments, the combining the first output voice signal and the second output voice signal may be superimposing the first output voice signal and the second output voice signal to obtain a total signal, and determining the total signal as the voice-enhanced output voice signal corresponding to the target voice. For example, the corresponding signal points in the first output voice signal and the second output voice signal may be superimposed to obtain a signal point sequence after the signal value superimposition. The signal point sequence may be determined as the voice-enhanced output voice signal corresponding to the target voice.

FIG. 6 is a flowchart illustrating another exemplary voice enhancement method according to some embodiments of the present disclosure.

In some embodiments, a method 600 may be performed by the processing device 110, the processing engine 112, or the processor 220. For example, the method 600 may be stored in a storage device (e.g., the storage device 140 or a storage unit of the processing device 110) in a form of a program or an instruction. When the processing device 110, the processing engine 112, the processor 220, or the modules shown in FIG. 12 perform the program or the instruction, the method 600 may be implemented. In some embodiments, the method 600 may be accomplished with one or more additional operations/steps not described below, and/or without one or more operations/steps discussed below. Additionally, an order of operations/steps shown in FIG. 6 is not limiting.

As shown in FIG. 6, the method 600 may include the following operations.

In 610, a first signal and a second signal of a target voice may be obtained. The first signal and the second signal may be voice signals of the target voice at different voice collection positions.

Specifically, operation 610 may be performed by a third voice obtaining module 1210.

For specific content about the obtaining the first signal and the second signal of the target voice, please refer to operation 410 and the related descriptions, which will not be repeated here.

When performing the voice enhancement processing on the voice signal, considering actual processing requirements and processing efficiency, the voice enhancement processing is performed based on the signal after sampling. Before processing the first signal and the second signal, the first signal and the second signal may be sampled, and the subsequent processing may be performed based on the sampled first signal and the sampled second signal. Alternatively, the sampling may also be performed when the first signal and the second signal are obtained, then the obtained first signal and second signal may be the signals after sampling.

In 620, a first downsampling signal and a second downsampling signal may be obtained by respectively performing a downsampling on the first signal and the second signal.

Specifically, operation 620 may be performed by a third sampling module 1220.

The downsampled first signal and the downsampled second signal obtained by respectively downsampling on the first signal and the second signal are the first downsampling signal and the second downsampling signal.

The downsampling refers to extracting signal points from an original signal, and a result obtained is equivalent to a signal obtained by sampling the original signal using a reduced sampling frequency. The signal point extraction refers to extracting the signal points from signal points of the original signal. In some embodiments, a downsampling multiple of the downsampling, that is, a ratio of a sampling frequency of the signal after downsampling to a sampling frequency of the original signal, may be set according to experience or actual needs. An M-times downsampling may be extracting a point every M points of the original signal to form a new signal. For example, the first signal and the second signal may be extracted every 5 points to realize 5 times downsampling. After the downsampling, the sampling frequency of the first downsampling signal and the second downsampling signal is 5 times the sampling frequency of the original first signal and the original second signal.

In some embodiments, a low pass filter module may also be added for downsampling to realize the collection of a low frequency signal. Through the low pass filter, a frequency aliasing caused by downsampling may be avoided.

In some embodiments, the downsampling multiple k of the downsampling may be set according to experience or actual requirements. For example, k may be 5, 10, etc.

It may be understood that if bandwidths of the original signals of the first signal and the second signal are f, after downsampling by k times, the bandwidths of the first downsampling signal and the second downsampling signal become f/k. At this time, the first downsampling signal and the second downsampling signal may be approximately regarded as low frequency parts of the first signal and the second signal whose frequencies are less than f/k. That is to say, the aforementioned downsampling of the first signal and the second signal may be approximately equivalent to performing a low pass filtering with a cutoff frequency of f/k on the first signal and the second signal.

In some embodiments, the first downsampling signal and the second downsampling signal may be supplemented so that their signal lengths and sampling frequencies meet a preset condition.

In some embodiments, a supplementary signal may be supplemented to a specific position in the first downsampling signal or the second downsampling signal according to an estimation on the original signal (i.e., the first signal or the second signal). Alternatively, the first downsampling signal and the second downsampling signal may further be supplemented by zero padding. The position of zero padding may be various positions such as the ends of the first downsampling signal and the second downsampling signal, an interpolation position in the middle of the first downsampling signal or the second downsampling signal, etc.

The preset condition may be that the signal length is greater than or equal to L. L may be set according to experience or actual requirements. For example, L may be the length of the original first signal or the original second signal, or may be greater than the length of the original first signal or the original second signal. The preset condition may further be that the sampling frequency of the signal is less than or equal to f, and f may be set according to experience or actual requirements.

By supplementing the first downsampling signal and the second downsampling signal so that their signal lengths meet the preset condition, a frequency resolution of signal may be improved when the first downsampling signal and the second downsampling signal are subsequently subjected to the voice enhancement processing. For example, if the first signal is downsampled by k times and then the first downsampling signal is supplemented so that the length of the first downsampling signal is consistent with that of the first signal, the frequency resolution of the first downsampling signal may be increased by k times. By increasing the frequency resolution, the precision of the signal processing may be improved and an effect of voice enhancement may be improved.

By supplementing the first downsampling signal and the second downsampling signal so that their sampling frequencies meet the preset condition, the condition for reducing the sampling frequency may be met, so as to achieve a better effect of downsampling to obtain low frequency signals, thereby improving the accuracy of the signal processing and improving the effect of voice enhancement.

In 630, an enhanced voice signal corresponding to the target voice may be obtained by processing the first downsampling signal and the second downsampling signal.

Specifically, operation 630 may be performed by a third enhancement processing module 1230.

The processing the first downsampling signal and the second downsampling signal includes performing a noise reduction processing on the first downsampling signal and the second downsampling signal, and the output signal obtained in this way is a denoised enhanced voice signal corresponding to the target voice.

In some embodiments, the obtaining an enhanced voice signal corresponding to the target voice by processing the first downsampling signal and the second downsampling signal may include: obtaining a frequency domain signal of the first downsampling signal and a frequency domain signal of the second downsampling signal; obtaining an enhanced frequency domain signal corresponding to the target voice by processing the frequency domain signal of the first downsampling signal and the frequency domain signal of the second downsampling signal; and determining the enhanced voice signal based on the enhanced frequency domain signal.

The frequency domain signal of the first downsampling signal and the frequency domain signal of the second downsampling signal may be obtained by performing a Fourier transform algorithm processing on the first downsampling signal and the second downsampling signal. Here, the first downsampling signal and the second downsampling signal may be the aforementioned downsampling signals after the length supplementation. The Fourier transform algorithm may use available Fourier transform algorithms such as Fourier series, Fourier transform, discrete time domain Fourier transform, discrete Fourier transform, or fast Fourier transform, etc.

In some embodiments, the obtaining an enhanced frequency domain signal corresponding to the target voice by processing the frequency domain signal of the first downsampling signal and the frequency domain signal of the second downsampling signal may include: obtaining a denoised enhanced frequency domain signal by performing a differential operation on the frequency domain signal of the first downsampling signal and the frequency domain signal of the second downsampling signal based on a difference factor between a noise signal of the first downsampling signal and a noise signal of the second downsampling signal.

Due to a difference in voice collection position, signal amounts of the noise signals in the first signal and the second signal are different, and a difference in the signal amounts of the noise signals in the first signal and the second signal may be represented by the difference factor.

In some embodiments, the difference factor may be represented by a ratio between signal energies of corresponding frames of the first downsampling signal and the second downsampling signal. In some embodiments, the difference factor may be represented by a signal ratio between the noise signal in the first signal and the noise signal in the second signal. The difference factor may be a constant value, or may be updated in real time according to the current signal.

In some embodiments, the difference factor may be determined based on signal detection when the voice signal is muted (i.e., when there is no voice signal). For example, a silent period (i.e., a period in which the target sound source does not emit voice) of the voice signal may be identified from a sound signal stream through a voice activity detection (VAD). During the silent period, as there is no voice from the target sound source, the first signal and the second signal obtained by two collection devices only contain noise components. At this time, the difference factor between the signal amounts of the noise signals obtained by the two collection devices may be directly reflected by the difference between the first signal and the second signal. The VAD refers to the voice activity detection, which is also known as a voice endpoint detection or a voice boundary detection, which may obtain a silent interval where the target sound source does not emit voice. In some embodiments, when a voice signal is detected, the difference factor may not be updated, that is, at this time, it can be approximately considered that the signal amounts of noise signals in the first (downsampling) signal and the second (downsampling) signal at the current moment are respectively the same as the signal amounts of the noise signals in the first (downsampling) signal and the second (downsampling) signal in the preceding silent interval. When no voice signal is detected, it is a silent period, and the difference factor may be updated in real-time according to the signal at this moment.

In some embodiments, when the difference factor is represented by the ratio of the signal energies of the first downsampling signal and the second downsampling signal, the current frame data of the first downsampling signal and the second downsampling signal may be smoothed first. In some embodiments, the smoothing may be performed on the current frame data of the first downsampling signal based on the current frame data of the first downsampling signal and smoothing parameters before the frame data of the previous one or more frames of the first downsampling signal; and the smoothing may be performed on the current frame data of the second downsampling signal based on the current frame data of the second downsampling signal and the smoothing parameters before the frame data of the previous one or more frames of the second downsampling signal. A ratio of the smoothed current frame data of the first downsampling signal to the smoothed current frame data of the second downsampling signal may be determined as the difference factor. For example:

$$Y1(n)=G*Y1(n-1)+(1-G)\text{abs}(\text{sig1}), \quad (10)$$

$$Y2(n)=G*Y2(n-1)+(1-G)\text{abs}(\text{sig2}), \quad (11)$$

$$\alpha=(Y1(n)/Y2(n))^2, \quad (12)$$

where, sig1 indicates the frequency domain signal of the first downsampling signal, sig2 indicates the frequency domain signal of the second downsampling signal, a indicates the difference factor, Y1($n$) indicates the signal data obtained after smoothing the current frame data of the first downsampling signal, Y2($n$) indicates the signal data obtained after smoothing the current frame data of the second downsampling signal, and G indicates the smoothing parameters between frame data. In some embodiments, the difference factor may be updated according to the current signal.

In some embodiments, the performing the differential operation on the frequency domain signal of the first downsampling signal and the frequency domain signal of the second downsampling signal based on the difference factor between the noise signal of the first downsampling signal and the noise signal of the second downsampling signal to obtain the denoised enhanced frequency domain signal may be: based on the difference factor, calculating a difference between the frequency domain signal of the first downsampling signal and the frequency domain signal of the second downsampling signal, and taking the output result as the denoised enhanced frequency domain signal. For example, the frequency domain signal of the first downsampling signal is sig1, the frequency domain signal of the second downsampling signal is sig2, the signal energy of sig1 may be expressed as abs(sig1)$^2$, the signal energy of sig2 may be expressed as abs(sig2)$^2$, and $\alpha$ indicates the difference factor. The denoised enhanced frequency domain signal S is:

$$S=\text{abs}(\text{sig1})^2-\alpha\ \text{abs}(\text{sig2})^2. \quad (13)$$

In some embodiments, the signal obtained by the differential operation between the frequency domain signal of the first downsampling signal and the frequency domain signal of the second downsampling signal may be determined as a preliminary enhanced frequency domain signal after a first stage of noise reduction. Further, a further differential operation may be performed based on the preliminary enhanced frequency domain signal, the frequency domain signal of the first downsampling signal, and the frequency domain signal of the second downsampling signal to obtain the denoised enhanced frequency domain signal.

Continually taking the aforementioned voice signal S obtained by performing the differential operation on the frequency domain signal of the first downsampling signal and the frequency domain signal of the second downsampling signal as an example, S is the preliminary enhanced frequency domain signal. A difference between S and abs (sig2)$^2$ may be further calculated to obtain output data R_N, such as:

$$R\_N=\text{abs}(\text{sig2})^2-S, \quad (14)$$

Then a difference between R_N and abs(sig1)$^2$ may be further calculated, and the obtained output data may be determined as the denoised enhanced frequency domain signal SS, such as:

$$SS=\text{abs}(\text{sig1})^2-R\_N. \quad (15)$$

Figure 9:
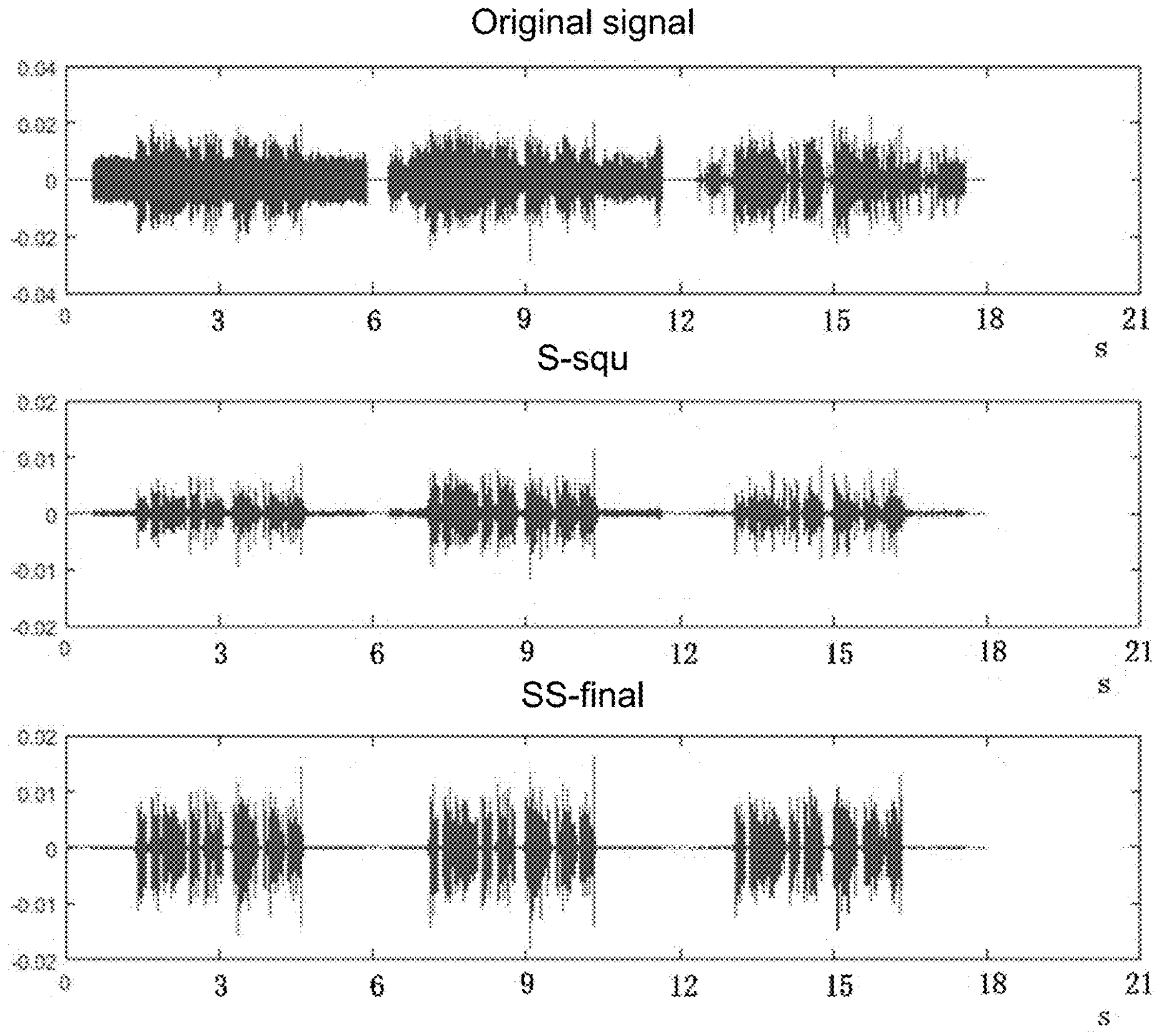
FIG. 9 is a schematic diagram illustrating an original signal corresponding to a target voice, a preliminary enhanced frequency domain signal S obtained after denoising, and an enhanced frequency domain signal SS according to some embodiments of the present disclosure.

FIG. 9 is a schematic diagram illustrating an original signal corresponding to a target voice, a preliminary enhanced frequency domain signal S obtained after denoising, and an enhanced frequency domain signal SS according to some embodiments of the present disclosure. After the original signal undergoes the first stage of noise reduction, in the obtained preliminary enhanced frequency domain signal S, most noise signals are filtered out. In the enhanced frequency domain signal SS obtained by the further differential operation, the rest part of the noise signals is further filtered out, and the voice signal is enhanced on the basis of the preliminary enhanced frequency domain signal S.

In some embodiments, the preliminary enhanced frequency domain signal, the frequency domain signal of the first downsampling signal, or the frequency domain signal of the second downsampling signal has a corresponding first weight coefficient.

In some embodiments, when the difference between S and $abs(sig\mathbf{2})^2$ is further calculated, S may correspond to a first weight coefficient, for example:

$$R\_N=abs(sig2)^2-hS, \quad (16)$$

where, h indicates the first weight coefficient, and the first weight coefficient may be a constant value, or may be updated in real time based on a voice existence probability of the currently processed signal.

In some embodiments, when the difference between R_N and $abs(sig\mathbf{1})^2$ is further calculated, R_N may correspond to a first weight coefficient. For example, the difference between R_N and $abs(sig\mathbf{1})^2$ may be calculated, and the obtained output data may be taken as the denoised enhanced frequency domain signal SS, that is:

$$SS=abs(sig1)^2-jR\_N, \quad (17)$$

where, j indicates the first weight coefficient, and the first weight coefficient may be a constant value, or may be updated in real time based on the voice existence probability of the currently processed signal. The voice existence probability refers to a probability of voice data existing in the signal data. In some embodiments, the voice existence probability may be expressed as a ratio of a power of the current signal (current frame signal) to a minimum power value. The minimum power value may be the minimum value determined for the target voice.

In some embodiments, after the denoised enhanced frequency domain signal is obtained, signal values of signal points in the enhanced frequency domain signal whose signal values are smaller than a preset parameter may be updated. The preset parameter may be set according to experience or actual needs, for example, the preset parameter may be 0, 0.01, etc. When a signal value of a signal point of the enhanced frequency domain signal is smaller than the preset parameter, the signal value of the signal point may be updated to the value of the preset parameter, for example:

$$SS\_final=max(SS\_final,\mu), \quad (18)$$

where, SS_final indicates the signal value of the signal point in the enhanced frequency domain signal, and μ indicates the preset parameter.

By updating the signal values, the occurrence of a minimal value in the obtained enhanced frequency domain signal may be avoided, thereby strengthening the effect of voice enhancement.

The determining the enhanced voice signal based on the enhanced frequency domain signal may be directly using the enhanced frequency domain signal as the enhanced voice signal, or converting the enhanced frequency domain signal from a frequency domain signal to a time domain signal according to actual needs and using the converted time domain signal as the enhanced voice signal. The conversion from the frequency domain signal into the time domain signal may be implemented by an inverse transform of the aforementioned Fourier transform.

In 640, an output voice signal corresponding to the target voice may be obtained by upsampling a part of the enhanced voice signal corresponding to the first downsampling signal and/or the second downsampling signal.

Specifically, operation 640 may be performed by a third processing output module 1240.

The upsampling a part of the enhanced voice signal corresponding to the first downsampling signal and/or the second downsampling signal refers to upsampling a part of the enhanced voice signal corresponding to a non-supplementary part of the first downsampling signal and/or the second downsampling signal. An upsampling multiple may be set based on actual needs. For example, the upsampling multiple may be equal to the downsampling multiple of the first downsampling signal and the second downsampling signal, so that a length of the signal after the upsampling of the corresponding part in the enhanced voice signal is consistent with the length of the first signal or the second signal.

As described above, the original signal bandwidth of the first signal or the second signal may be expressed as f, after k-times downsampling, the bandwidth of the first downsampling signal or the second downsampling signal becomes f/k. The length of the original first signal or the original second signal is L, the length of the first downsampling signal or the second downsampling signal obtained after downsampling becomes L/k, and the signal length of the part of the signal in the enhanced voice signal corresponding to the first downsampling signal or the second downsampling signal is L/k as well. By upsampling the part of the signal by k times, the length of the part of the signal may be restored to L.

It may be understood that the processing of the first signal and the second signal may be performed by processing one or more frame signals one by one, and the final output voice signal of the target voice is formed by superimposing the signals obtained by the processing of each frame.

FIG. 7 is a flowchart illustrating an exemplary first processing technique according to some embodiments of the present disclosure.

In some embodiments, a method 700 may be performed by the processing device 110, the processing engine 112, or the processor 220. For example, the method 700 may be stored in a storage device (e.g., the storage device 140 or a storage unit of the processing device 110) in a form of a program or an instruction. When the processing device 110, the processing engine 112, the processor 220, or the modules shown in FIG. 11 performs the program or the instruction, the method 700 may be implemented. In some embodiments, the method 700 may be accomplished with one or more additional operations/steps not described below, and/or without one or more operations/steps discussed below. Additionally, an order of operations/steps shown in FIG. 7 is not limiting.

As shown in FIG. 7, the method 700 may include the following operations.

In 710, a first low frequency band signal corresponding to a low frequency part of a first signal and a second low frequency band signal corresponding to a low frequency part of a second signal may be obtained.

In some embodiments, the low frequency parts of the first signal and the second signal may be obtained by performing a low pass filtering operation, or may be obtained by frequency-based sub-band division using other algorithms or devices.

In some embodiments, the first low frequency band signal and the second low frequency band signal may be supplemented so that their signal lengths meet a preset condition. The manner of supplementing the signal may be similar to the aforementioned manner of supplementing the first downsampling signal and the second downsampling signal. For specific content, please refer to operation 620 and the related descriptions.

In 720, a frequency domain signal of the first low frequency band signal and a frequency domain signal of the second low frequency band signal may be obtained.

The manner of obtaining the frequency domain signal of the first low frequency band signal and the frequency domain signal of the second low frequency band signal is similar to the manner of obtaining the frequency domain signal of the first downsampling signal and the frequency domain signal of the second downsampling signal in method 600. For specific content, please refer to operation 630 and the related descriptions.

In 730, an enhanced frequency domain signal corresponding to the target voice may be obtained by processing the frequency domain signal of the first low frequency band signal and the frequency domain signal of the second low frequency band signal.

The manner of processing the frequency domain signal of the first low frequency signal and the frequency domain signal of the second low frequency signal to obtain the enhanced frequency domain signal corresponding to the target voice is similar to the manner of processing the frequency domain signal of the first downsampling signal and the frequency domain signal of the second downsampling signal. For specific content, please refer to operation 630 and the related descriptions.

In 740, a first output voice signal corresponding to the target voice may be determined based on the enhanced frequency domain signal.

The determining the first output voice signal corresponding to the target voice based on the enhanced frequency domain signal may be directly using the enhanced frequency domain signal as the first output voice signal, or converting the enhanced frequency domain signal from the frequency domain signal to a time domain signal according to actual needs and using the converted time domain signal as the first output voice signal. The conversion from the frequency domain signal to the time domain signal may be obtained by an inverse transform of the aforementioned Fourier transform.

Figure 8:
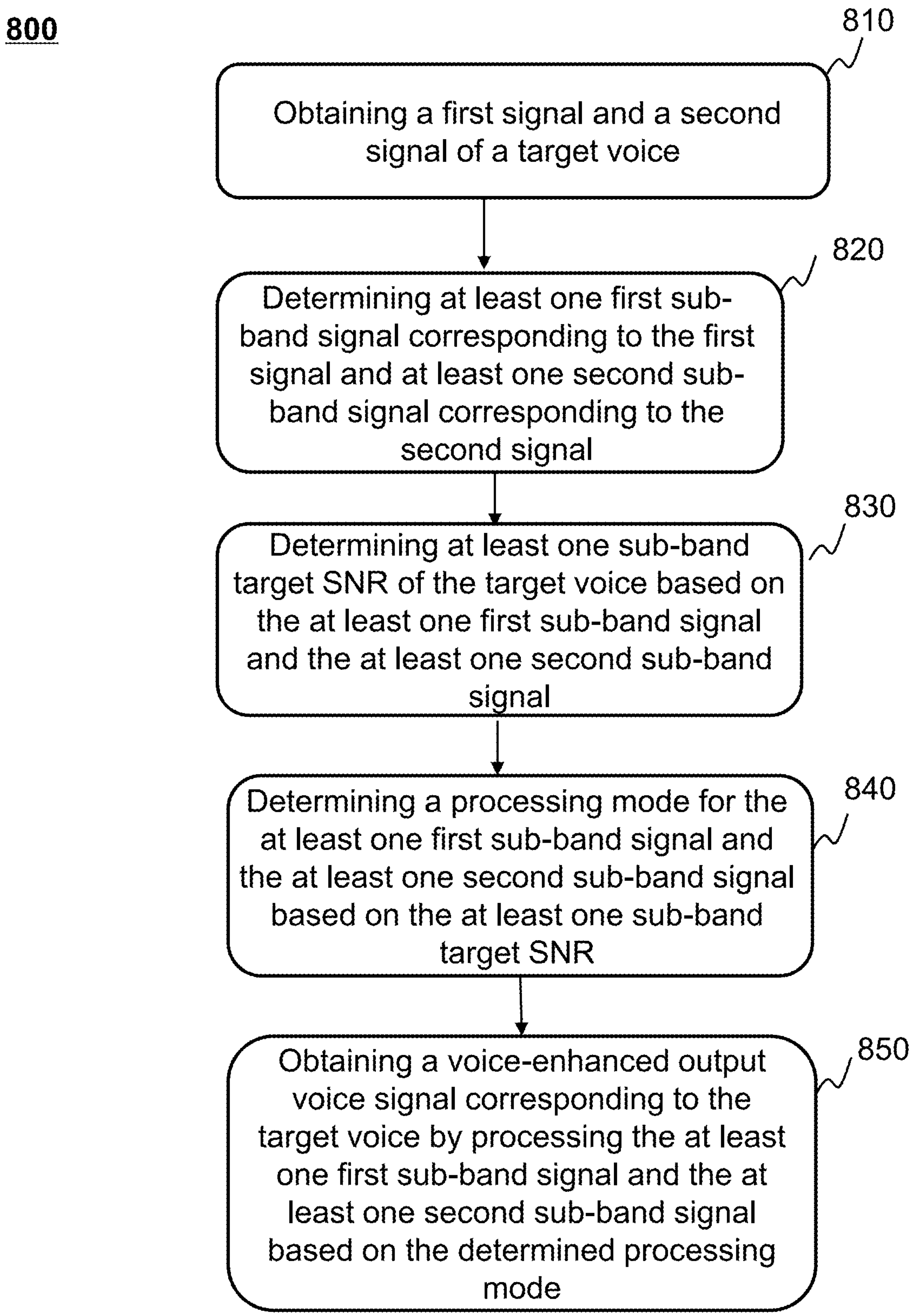
FIG. 8 is a flowchart illustrating another exemplary voice enhancement method according to some embodiments of the present disclosure.

FIG. 8 is a flowchart illustrating another exemplary voice enhancement method according to some embodiments of the present disclosure.

In some embodiments, a method 800 may be performed by the processing device 110, the processing engine 112, or the processor 220. For example, the method 800 may be stored in a storage device (e.g., the storage device 140 or a storage unit of the processing device 110) in a form of a program or an instruction. When the processing device 110, the processing engine 112, the processor 220, or the modules shown in FIG. 13 perform the program or the instruction, the method 800 may be implemented. In some embodiments, the method 800 may be accomplished with one or more additional operations/steps not described below, and/or without one or more operations/steps discussed below. Additionally, an order of operations/steps shown in FIG. 8 is not limiting.

As shown in FIG. 8, the method 800 may include the following operations.

In 810, a first signal and a second signal of a target voice may be obtained. The first signal and the second signal may be voice signals of the target voice at different voice collection positions.

Specifically, operation 810 may be performed by a fourth voice obtaining module 1310.

For specific content of the obtaining the first signal and the second signal of the target voice, please refer to operation 410 and the related descriptions, which will not be repeated here.

In 820, at least one first sub-band signal corresponding to the first signal and at least one second sub-band signal corresponding to the second signal may be determined.

Specifically, operation 820 may be performed by a sub-band determination module 1320.

In some embodiments, the first signal and the second signal may be divided into sub-bands based on a frequency band of signal to obtain the at least one first sub-band signal corresponding to the first signal and the at least one second sub-band signal corresponding to the second signal. For example, the sub-band determination module may perform the sub-band division according to a frequency band category of a low frequency, a medium frequency, or a high frequency, or may also perform the sub-band division according to a specific frequency bandwidth (e.g., every 2 kHz is considered as a frequency band). In some embodiments, the sub-band division may also be performed based on signal frequency points of the first signal and the second signal. A signal frequency point refers to a value after a decimal point in the frequency value of a signal. For example, if the frequency value of a signal is 72.810, the signal frequency point of the signal is 810. The sub-band division based on the signal frequency point may be performing a sub-band division on a signal according to a specific signal frequency point width, for example: the signal frequency points 810-830 are used as a sub-band, or the signal frequency points 600-620 are used as a sub-band.

In some embodiments, the at least one first sub-band signal corresponding to the first signal and the at least one second sub-band signal corresponding to the second signal may be obtained by filtering or may be obtained based on the sub-band division using other algorithms or devices.

It may be understood that in the at least one first sub-band signal corresponding to the first signal and the at least one second sub-band signal corresponding to the second signal, based on a sub-band division rule, the sub-bands of the first signal and the second signal are paired, that is, one first sub-band signal of the first signal corresponds to one second sub-band signal of the second signal.

In 830, at least one sub-band target SNR of the target voice may be determined based on the at least one first sub-band signal and the at least one second sub-band signal.

Specifically, operation 830 may be performed by a sub-band SNR determination module 1330.

The determining at least one sub-band target SNR of the target voice based on the at least one first sub-band signal and the at least one second sub-band signal refers to: for one first sub-band signal of the first signal and the corresponding second sub-band signal of the second signal (that is, a pair of sub-band signals), determining a sub-band target SNR correspondingly; or for each pair of sub-band signals among a plurality of first sub-band signals and a plurality of second sub-band signals obtained by sub-band division, determining the corresponding sub-band target SNR, and a plurality of sub-band target SNRs may be correspondingly obtained.

For one first sub-band signal of the first signal and one second sub-band signal of the corresponding second signal, that is, a pair of sub-band signals, one sub-band target SNR may be determined correspondingly. A manner as the aforementioned manner for determining the target SNR corresponding to the first signal and the second signal may be adopted, that is, the manner for determining the target SNR of the target voice based on the first signal and/or the second signal may be adopted. For details, please refer to operation 410 and the related descriptions.

In 840, a processing mode for the at least one first sub-band signal and the at least one second sub-band signal may be determined based on the at least one sub-band target SNR.

Specifically, operation 840 may be performed by a sub-band SNR discrimination module 1340.

The determining the processing mode of the at least one first sub-band signal and the at least one second sub-band signal based on the at least one sub-band target SNR, is determining a processing mode for a first sub-band signal and a second sub-band signal according to a sub-band target SNR.

In some embodiments, whether the sub-band target SNR meets a preset condition may be determined, and then a corresponding processing mode is determined. In some embodiments, in response to that the sub-band target SNR is smaller than a first threshold, the first mode described elsewhere of the present disclosure may be used to process the at least one first sub-band signal and the at least one second sub-band signal. In response to that the sub-band target SNR is greater than a second threshold, the second mode described elsewhere of the present disclosure may be used to process the at least one first sub-band signal and the at least one second sub-band signal. The first threshold is smaller than the second threshold. For more information about the discrimination of the sub-band target SNR, the first threshold, the second threshold, the first mode, and the second mode, please refer to FIG. 4 and the related descriptions.

In some embodiments, the first processing technique described elsewhere in the present disclosure may be used to process low frequency parts of the at least one first sub-band signal and the at least one second sub-band signal to obtain at least one first sub-band output voice signal with the low frequency part of the target voice enhanced.

In some embodiments, the second processing technique described elsewhere in the present disclosure may be used to process high frequency parts of the at least one first sub-band signal and the at least one second sub-band signal to obtain at least one second sub-band output voice signal with the high frequency part of the target voice enhanced.

In some embodiments, the at least one first sub-band output voice signal and at least one second sub-band output voice signal may be combined to obtain an output voice signal. That is, each pair of sub-band signals (including a first sub-band signal and the corresponding second sub-band signal) is processed to obtain a sub-band output voice signal, and the plurality of sub-band output voice signals may be combined to obtain an overall output voice signal of the target voice.

In some embodiments, after processing each pair of sub-band signals, each sub-band output voice signal obtained respectively may be used as an output voice signal corresponding to each sub-band signal.

In some embodiments, according to actual needs, signal data of a specific sub-band in the first signal and the second signal may further be selected. The specific sub-band signal (a first sub-band signal and a second sub-band signal of the specific sub-band) may be processed to obtain the sub-band output signal. The sub-band output signal may be used as the required output voice signal.

In 850, a voice-enhanced output voice signal corresponding to the target voice may be obtained by processing the at least one first sub-band signal and the at least one second sub-band signal based on the determined processing mode.

Specifically, operation 850 may be performed by a fourth enhancement processing module 1350.

In some embodiments, the first processing technique may include: obtaining a frequency domain signal of the at least one first sub-band signal and a frequency domain signal of the at least one second sub-band signal; obtaining at least one sub-band enhanced frequency domain signal corresponding to the target voice by processing the frequency domain signal of the at least one first sub-band signal and the frequency domain signal of the at least one second sub-band signal; and determining the at least one first sub-band output voice signal based on the at least one sub-band enhanced frequency domain signal.

The manner for obtaining the frequency domain signal of the first sub-band signal and the frequency domain signal of the second sub-band signal is similar to the manner for obtaining the frequency domain signal of the first downsampling signal and the frequency domain signal of the second downsampling signal. For the specific contents, please refer to FIG. 4 and the related descriptions.

The obtaining at least one sub-band enhanced frequency domain signal corresponding to the target voice by processing the frequency domain signal of the at least one first sub-band signal and the frequency domain signal of the at least one second sub-band signal is similar to the aforementioned obtaining the voice-enhanced enhanced frequency domain signal corresponding to the target voice by processing the frequency domain signal of the first downsampling signal and the frequency domain signal of the second downsampling signal. For details, please refer to FIG. 4, FIG. 5, FIG. 6, and the related descriptions.

In some embodiments, the obtaining a frequency domain signal of the at least one first sub-band signal and a frequency domain signal of the at least one second sub-band signal may include: obtaining at least one first sampling sub-band signal and at least one second sampling sub-band signal by sampling the at least one first sub-band signal and the at least one second sub-band signal, respectively; and obtaining the frequency domain signal of the at least one first sub-band signal and the frequency domain signal of the at least one second sub-band signal based on the at least one first sampling sub-band signal and the at least one second sampling sub-band signal.

The sampling refers to sampling (signal extracting) the first sub-band signal and the second sub-band signal according to a certain sampling frequency, and the obtained signals are the first sampling sub-band signal and the second sampling sub-band signal.

The manner for obtaining the frequency domain signal of the at least one first sub-band signal and the frequency domain signal of the at least one second sub-band signal based on the at least one first sampling sub-band signal and the at least one second sampling sub-band signal is similar to the manner for obtaining the frequency domain signal of the first downsampling signal and the frequency domain signal of the second downsampling signal. For details, please refer to FIG. 4 and related descriptions.

In some embodiments, the first processing technique may further include: supplementing the at least one first sampling sub-band signal and the at least one second sampling sub-band signal so that their signal lengths meet a preset condition. The manner for supplementing the signal to meet the preset condition is similar to the aforementioned manner for supplementing the first downsampling signal and the second downsampling signal so that the signal lengths meet the preset condition. For details, please refer to FIG. 4, FIG. 5, FIG. 6, and FIG. 7 and the related descriptions.

In some embodiments, the obtaining at least one sub-band enhanced frequency domain signal corresponding to the target voice by processing the frequency domain signal of the at least one first sub-band signal and the frequency domain signal of the at least one second sub-band signal may include: obtaining the denoised at least one sub-band enhanced frequency domain signal by performing a differential operation on the frequency domain signal of the at least one first sub-band signal and the frequency domain signal of the second sub-band signal based on a difference factor between a noise signal of the at least one first sub-band signal and a noise signal of the at least one second sub-band signal. The manner is similar to the manner for performing the differential operation on the frequency domain signal of the first downsampling signal and the frequency domain signal of the second downsampling signal to obtain the denoised enhanced frequency domain signal. For details, please refer to FIG. 4, FIG. 5, FIG. 6, FIG. 7, and the related descriptions. The difference factor may be determined based on signal energies of the at least one first sub-band signal and the at least one second sub-band signal. The manner for determining the difference factor is similar to the aforementioned manner for determining the difference factor based on the noise signal of the first downsampling signal and the noise signal of the second downsampling signal. For details, please refer to FIG. 4, FIG. 5, FIG. 6, FIG. 7, and the related descriptions.

In some embodiments, the differential operation may be performed on the frequency domain signal of the at least one first sub-band signal and the frequency domain signal of the at least one second sub-band signal based on the difference factor between the noise signal of the at least one first sub-band signal and the noise signal of the at least one second sub-band signal, and the obtained at least one voice signal may be determined as at least one preliminary sub-band enhanced frequency domain signal after the first stage of noise reduction. The manner is similar to the aforementioned manner for performing the differential operation on the frequency domain signal of the first downsampling signal and the frequency domain signal of the second downsampling signal, and taking the obtained voice signal as the preliminary enhanced frequency domain signal after the first stage of noise reduction. For more content, please refer to FIG. 4, FIG. 5, FIG. 6, FIG. 7, and the related descriptions. In some embodiments, the differential operation may be performed based on the at least one preliminary sub-band enhanced frequency domain signal, the frequency domain signal of the at least one first sub-band signal, and the frequency domain signal of the at least one second sub-band signal to obtain the at least one sub-band enhanced frequency domain signal after the noise reduction. The manner is similar to the aforementioned manner for performing the differential operation based on the preliminary enhanced frequency domain signal, the frequency domain signal of the first downsampling signal, and the frequency domain signal of the second downsampling signal to obtain the enhanced frequency domain signal after noise reduction. For details, please refer to FIG. 4, FIG. 5, FIG. 6, FIG. 7, and the related descriptions.

In some embodiments, the at least one preliminary sub-band enhanced frequency domain signal, the frequency domain signal of the at least one first sub-band signal, and/or the frequency domain signal of the at least one second sub-band signal corresponds to a first weight coefficient. The first weight coefficient is determined based on a voice existence probability of a currently processed signal. The first weight coefficient is similar to the first weight coefficient corresponding to the aforementioned preliminary enhanced frequency domain signal, the frequency domain signal of the first downsampling signal, and/or the frequency domain signal of the second downsampling signal, and the determination manner of the two first weight coefficients are also similar. For details, please refer to FIG. 4, FIG. 5, FIG. 6, FIG. 7, and the related descriptions.

In some embodiments, the differential operation may be performed on the aforementioned at least one preliminary sub-band enhanced frequency domain signal, the frequency domain signal of at least one first sub-band signal, and the frequency domain signal of at least one second sub-band signal based on the first weight coefficient to obtain the at least one sub-band enhanced frequency domain signal after noise reduction. The manner for obtaining at least one sub-band enhanced frequency domain signal by differential operation based on the first weight coefficient is similar to the aforementioned manner for obtaining an enhanced frequency domain signal by differential operation based on the first weight coefficient. For details, please refer to FIG. 4, FIG. 5, FIG. 6, and FIG. 7, and the related descriptions.

In some embodiments, signal values of signal points in the at least one sub-band enhanced frequency domain signal whose signal values are smaller than a preset parameter may be updated. The manner for updating the signal values is similar to the aforementioned manner for updating the signal values of the signal points whose signal values are smaller than the preset parameter in the enhanced frequency domain signal. For details, please refer to FIG. 4, FIG. 5, FIG. 6, FIG. 7, and the related description.

In some embodiments, the second processing technique may include: obtaining the at least one second sub-band output voice signal with the high frequency part of the target voice enhanced by performing a differential operation based on the at least one first sub-band signal and the at least one second sub-band signal. The manner is similar to the aforementioned differential operation performed based on the first high frequency band signal and the second high frequency band signal to obtain the second output voice signal with the high frequency part of the target voice enhanced. For details, please refer to FIG. 4, FIG. 5, FIG. 6, FIG. 7, and the related descriptions.

In some embodiments, an upsampling may be performed on the at least one first sub-band signal and the at least one second sub-band signal to obtain at least one first upsampling signal and at least one second upsampling signal, respectively. The manner is similar to the aforementioned manner for upsampling the first high frequency band signal and the second high frequency band signal to obtain the first upsampling signal and the second upsampling signal, respectively. For details, please refer to FIG. 2, FIG. 3, FIG. 4, FIG. 5, and the related descriptions. Further, the differential operation may be performed on the at least one first upsampling signal and the at least one second upsampling signal to obtain the at least one second sub-band output with the high frequency part of the target voice signal enhanced. The manner is similar to the aforementioned manner for performing the differential operation of the first upsampling signal and the second upsampling signal to obtain the second output voice signal with the high frequency part of the target voice enhanced. For details, please refer to FIG. 4, FIG. 5, FIG. 6, FIG. 7, and the related descriptions.

In some embodiments, the differential operation may include: performing the differential operation based on a first timing signal of the at least one first sub-band signal and at least one timing signal of the at least one second sub-band signal before the timing of the first timing signal to obtain the second sub-band output voice signal with the high frequency part of the target voice enhanced. The manner is similar to the aforementioned manner for performing the differential operation on the first timing signal of the first high frequency band signal and at least one timing signal of the second high frequency band signal before the timing of the first timing signal to obtain the second output voice signal with the high frequency part of the target voice enhanced. For details, please refer to FIG. 4, FIG. 5, FIG. 6, and FIG. 7, and their related descriptions.

In some embodiments, in the at least one timing signal before the timing of the first timing signal, each timing signal corresponds to a second weight coefficient. The differential operation may be performed based on the first timing signal of the first signal, the at least one timing signal of the second signal before the timing of the first timing signal, and the second weight coefficient corresponding to the at least one timing signal. The second weight coefficient has a similar function with the aforementioned second weight coefficient of the at least one timing signal of the second high frequency band signal before the timing of the first timing signal, and the determination manners of the two are similar too. For details, please refer to FIG. 4, FIG. 5, FIG. 6, and FIG. 7, and their related descriptions.

The performing the differential operation based on the first timing signal of the first signal, the at least one timing signal of the second signal before the timing of the first timing signal, and the second weight coefficient corresponding to the at least one timing signal, is similar to the aforementioned performing the differential operation based on the first timing signal of the first high frequency band signal, at least one timing signal of the second high frequency band signal before the timing of the first timing signal, and the second weight coefficient of at least one timing signal. For the specific contents, please refer to FIG. 4, FIG. 5, FIG. 6, FIG. 7, and the related descriptions.

In some embodiments, the second weight coefficient may be determined based on the first timing signal and the second weight coefficient of the at least one timing signal before a previous timing signal of the second signal corresponding to a previous timing signal of the first timing signal in the first signal. The manner for determining the second weight coefficient is similar to the manner for determining the second weight coefficient corresponding to the first timing signal based on the first timing signal of the first high frequency band signal and the second weight coefficient corresponding to the previous timing signal of the first timing signal in the first high frequency band signal. For the specific contents, please refer to FIG. 4, FIG. 5, FIG. 6, FIG. 7, and the related descriptions.

Figure 10:
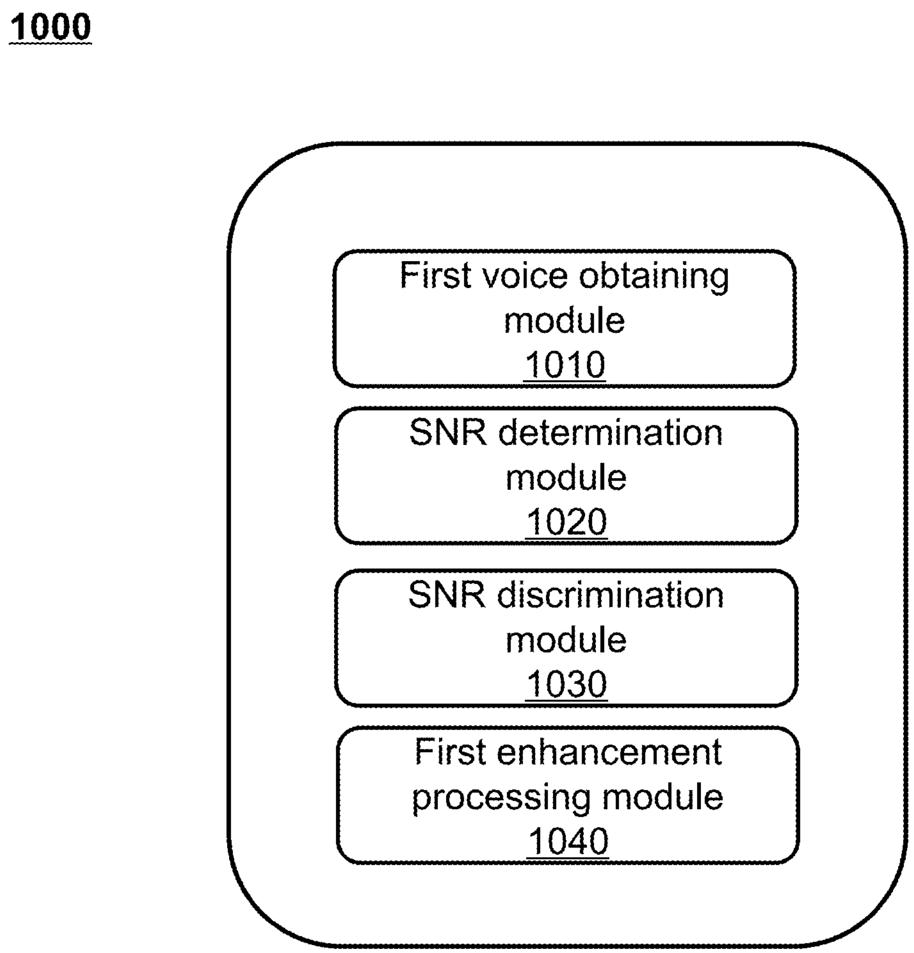
FIG. 10 is a block diagram illustrating an exemplary voice enhancement system according to some embodiments of the present disclosure.

FIG. 10 is a block diagram illustrating an exemplary voice enhancement system according to some embodiments of the present disclosure.

In some embodiments, a voice enhancement system 1000 may be implemented on the processing device 110, which includes a first voice obtaining module 1010, an SNR determination module 1020, an SNR discrimination module 1030, and a first enhancement processing module 1040.

In some embodiments, the first voice obtaining module 1010 may be configured to obtain a first signal and a second signal of a target voice. The first signal and the second signal may be voice signals of the target voice at different voice collection positions.

In some embodiments, the SNR determination module 1020 may be configured to determine a target SNR of the target voice based on the first signal or the second signal.

In some embodiments, the SNR discrimination module 1030 may be configured to determine a processing mode for the first signal and the second signal based on the target SNR.

In some embodiments, the first enhancement processing module 1040 may be configured to obtain a voice-enhanced output voice signal corresponding to the target voice by process the first signal and the second signal based on the determined processing mode.

Figure 11:
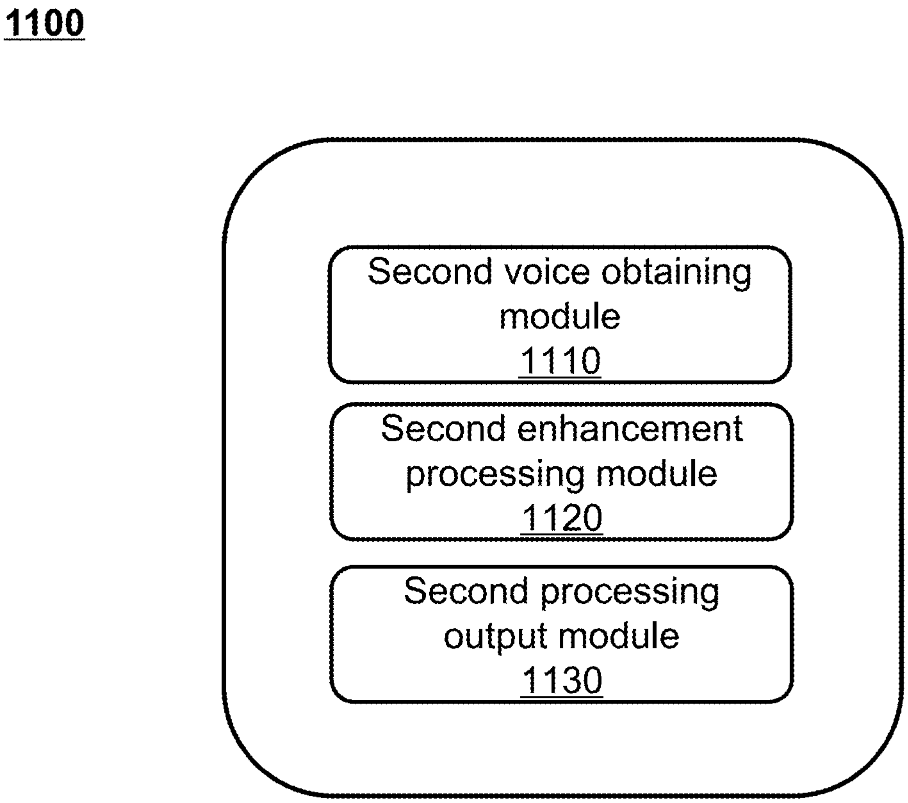
FIG. 11 is a block diagram illustrating another exemplary voice enhancement system according to some embodiments of the present disclosure.

FIG. 11 is a block diagram illustrating another exemplary voice enhancement system according to some embodiments of the present disclosure.

In some embodiments, a voice enhancement system 1100 may be implemented on the processing device 110, which includes a second voice obtaining module 1110, a second enhancement processing module 1120, and a second processing output module 1130.

In some embodiments, the second voice obtaining module 1110 may be configured to obtain a first signal and a second signal of a target voice. The first signal and the second signal are voice signals of the target voice at different voice collection positions.

In some embodiments, the second enhancement processing module 1120 may be configured to obtain a first output voice signal with a low frequency part of the target voice enhanced by processing the low frequency part of the first signal and the low frequency part of the second signal using a first processing technique; and obtain a second output voice signal with a high frequency part of the target voice enhanced by processing the high frequency part of the first signal and the high frequency part of the second signal using a second processing technique.

In some embodiments, the second processing output module 1130 may be configured to obtain a voice-enhanced output voice signal corresponding to the target voice by combining the first output voice signal and the second output voice signal.

Figure 12:
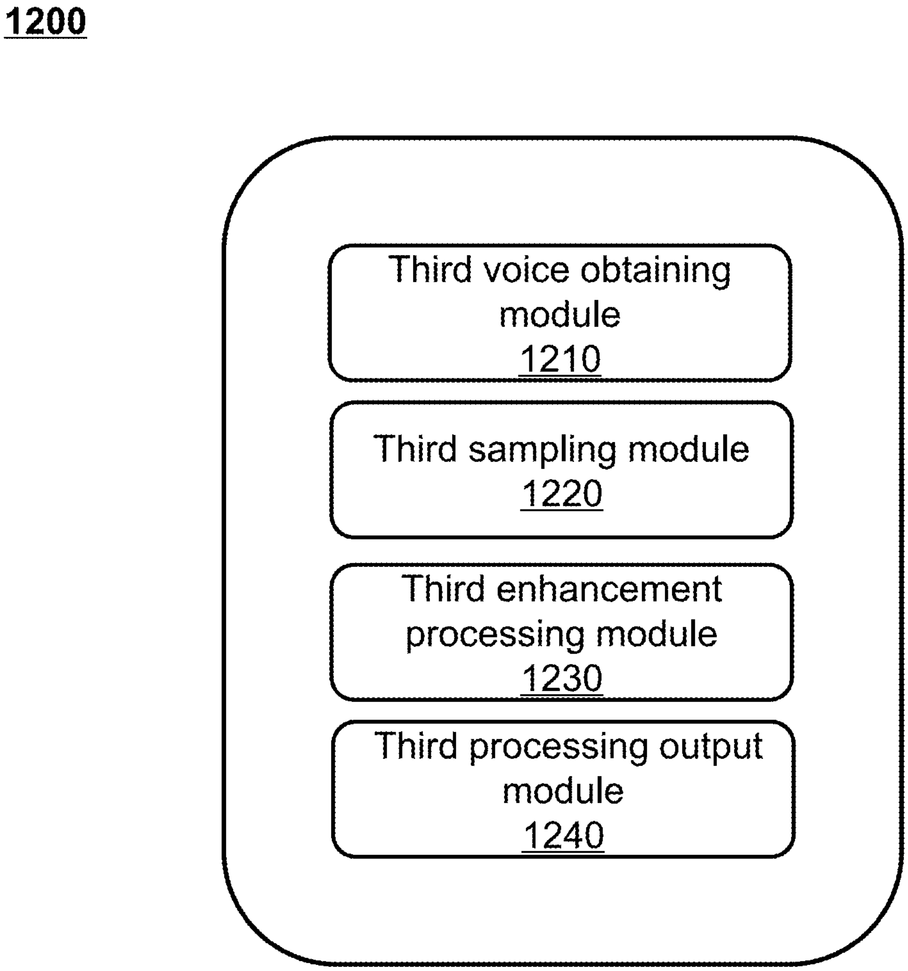
FIG. 12 is a block diagram illustrating another exemplary voice enhancement system according to some embodiments of the present disclosure.

FIG. 12 is a block diagram illustrating another exemplary voice enhancement system according to some embodiments of the present disclosure.

In some embodiments, a voice enhancement system 1200 may be implemented on the processing device 110, which includes a third voice obtaining module 1210, a third sampling module 1220, a third enhancement processing module 1230, and a third processing output module 1240.

In some embodiments, the third voice obtaining module 1210 may be configured to obtain a first signal and a second signal of the target voice. The first signal and the second signal may be voice signals of the target voice at different voice collection positions.

In some embodiments, the third sampling module 1220 may be configured to obtain a first downsampling signal and a second downsampling signal by respectively performing a downsampling on the first signal and the second signal.

In some embodiments, the third enhancement processing module 1230 may be configured to obtain an enhanced voice signal corresponding to the target voice by processing the first downsampling signal and the second downsampling signal.

In some embodiments, the third processing and output module 1240 may be configured to obtain an output voice signal corresponding to the target voice by upsampling a part of the enhanced voice signal corresponding to the first downsampling signal and/or the second downsampling signal.

Figure 13:
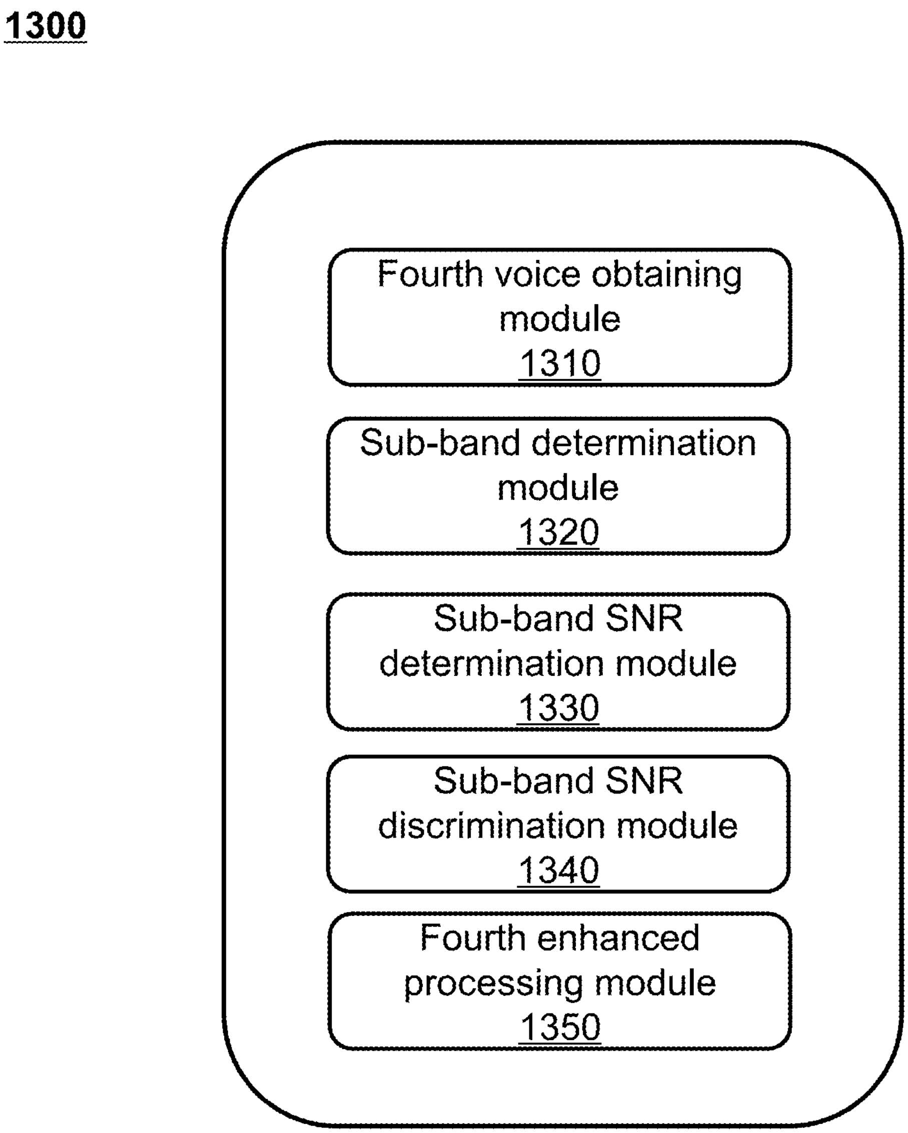
FIG. 13 is a block diagram illustrating another exemplary voice enhancement system according to some embodiments of the present disclosure.

FIG. 13 is a block diagram illustrating another exemplary voice enhancement system according to some embodiments of the present disclosure.

In some embodiments, the voice enhancement system 1300 may be implemented on the processing device 110, which includes a fourth voice obtaining module 1310, a sub-band determination module 1320, a sub-band SNR determination module 1330, a sub-band SNR discrimination module 1340, and a fourth enhanced processing module 1350.

In some embodiments, the fourth voice obtaining module 1310 may be configured to obtain a first signal and a second signal of a target voice. The first signal and the second signal may be voice signals of the target voice at different voice collection positions.

In some embodiments, the sub-band determination module 1320 may be configured to determine at least one first sub-band signal corresponding to the first signal and at least one second sub-band signal corresponding to the second signal.

In some embodiments, the sub-band SNR determination module 1330 may be configured to determine, based on the at least one first sub-band signal or the at least one second sub-band signal, at least one sub-band target SNR of the target voice.

In some embodiments, the sub-band SNR discrimination module 1340 may be configured to determine a processing mode for the at least one first sub-band signal and the at least one second sub-band signal based on the at least one sub-band target SNR.

In some embodiments, the fourth enhancement processing module 1350 may be configured to obtain a voice-enhanced output voice signal corresponding to the target voice by processing the at least one first sub-band signal and the at least one second sub-band signal based on the determined processing mode.

It should be understood that the illustrated systems and their modules may be implemented in various ways. For example, in some embodiments, systems and their modules may be implemented by hardware, software, or a combination of software and hardware. The hardware part may be implemented using dedicated logic. The software part can be stored in the memory and executed by appropriate instructions, such as a microprocessor or dedicated design hardware. Those skilled in the art can understand that the above methods and systems can be implemented using computer-executable instructions and/or contained in processor control code, for example, such codes are provided on a carrier medium such as a magnetic disk, CD, or DVD-ROM, a programmable memory such as a read-only memory (firmware), or a data carrier such as an optical or electronic signal carrier. The systems and their modules of the present disclosure may be implemented by a hardware circuit, which includes a semiconductor such as a very large-scale integration or gate array, a logic chip, a transistor, etc., or a programmable hardware device such as a field programmable gate array, a programmable logic device, etc. The systems and their modules of the present disclosure may be implemented by a software, for example, a software executed by various types of processors. The systems and their modules of the present disclosure may also be implemented by a combination of the hardware circuit and the software (e.g., a firmware).

It should be noted that the above descriptions of the voice enhancement systems and the modules are only for convenience of description, and do not limit the present disclosure to the scope of the illustrated embodiments. It will be understood that for those skilled in the art, after understanding the principle of the system, it is possible to arbitrarily combine various modules, or form a subsystem to connect with other modules without departing from the principle.

The embodiments of the present disclosure also provide a voice enhancement device, including at least one storage medium and at least one processor. The at least one storage medium is used to store computer instructions. The at least one processor is used to execute the computer instructions to implement the following method. The method includes obtaining a first signal and a second signal of the target voice, the first signal and the second signal being voice signals of the target voice at different voice collection positions; obtaining a first downsampling signal and a second downsampling signal by respectively performing a downsampling on the first signal and the second signal; obtaining an enhanced voice signal corresponding to the target voice by processing the first downsampling signal and the second downsampling signal; and obtaining a first output voice signal with the low frequency part of the target voice enhanced by upsampling a part of the enhanced voice signal corresponding to the first downsampling signal and the second downsampling signal.

The embodiments of the present disclosure also provide a voice enhancement device, including at least one storage medium and at least one processor. The at least one storage medium is used to store the computer instructions. The at least one processor is used to execute the computer instructions to implement the following method. The method includes obtaining a first signal and a second signal of a target voice, the first signal and the second signal being the voice signals of the target voice at different voice collection positions; obtaining a first output voice signal with a low frequency part of the target voice enhanced by processing the low frequency part of the first signal and the low frequency part of the second signal by using a first processing technique; obtaining a second output voice signal with a high frequency part of the target voice enhanced by processing the high frequency part of the first signal and the high frequency part of the second signal by using a second processing technique; and obtaining a voice-enhanced output voice signal corresponding to the target voice by combining the first output voice signal and the second output voice signal.

The embodiments of the present disclosure also provide a voice enhancement device, including at least one storage medium and at least one processor. The at least one storage medium is used to store computer instructions. The at least one processor is used to execute the computer instructions to implement the following method. The method includes obtaining a first signal and a second signal of a target voice, the first signal and the second signal being the voice signals of the target voice at different voice collection positions; determining a target SNR of the target voice based on the first signal or the second signal; determining a processing mode for the first signal and the second signal based on the target SNR; and obtaining a voice-enhanced output voice signal corresponding to the target voice by processing the first signal and the second signal based on the determined processing mode.

The embodiments of the present disclosure also provide a voice enhancement device, including at least one storage medium and at least one processor. The at least one storage medium is used to store computer instructions. The at least one processor is used to execute the computer instructions to implement the following method. The method includes obtaining a first signal and a second signal of a target voice, the first signal and the second signal being the voice signals of the target voice at different voice collection positions; determining at least one first sub-band signal corresponding to the first signal and at least one second sub-band signal corresponding to the second signal; determining at least one sub-band target SNR of the target voice based on the at least one first sub-band signal or the at least one second sub-band signal; determining a processing mode for the at least one first sub-band signal and the at least one second sub-band signal based on the at least one sub-band target SNR; and obtaining a voice-enhanced output voice signal corresponding to the target voice by processing the at least one first sub-band signal and the at least one second sub-band signal based on the determined processing mode.

The possible beneficial effects of the embodiments of the present disclosure include but are not limited to: (1) in the present disclosure, by downsampling the first signal and the second signal of the target voice and padding the length with zeros, the voice enhancement process is performed, and then a partial upsampling is performed to obtain the final output voice signal, which realizes the high frequency resolution enhancement processing of the low frequency part, and improves the voice enhancement effect of the low frequency part; (2) in the present disclosure, by separately processing the high frequency part and the low frequency part of the first signal and the second signal of the target voice, the voice enhancement effect of the low frequency part and the voice enhancement effect of the high frequency part are effectively improved respectively; (3) in the present disclosure, based on discrimination of the target SNR the target voice, different processing modes for the first signal and the second signal of the target voice are selected, so that the target voice may be more accurately and effectively enhanced according to signal features of different SNRs, thereby enhancing the voice enhancement effect; (4) in the present disclosure, by dividing the first signal and the second signal of the target voice into sub-bands, and performing voice enhancement processing of the target voice based on the sub-band signals, a more targeted and finer voice enhancement processing is realized, so as to improve the effect of the voice enhancement. It should be noted that different embodiments may have different beneficial effects. In different embodiments, the possible beneficial effects may be any one or a combination of the above, or any other possible beneficial effects.

Having thus described the basic concepts, it may be rather apparent to those skilled in the art after reading this detailed disclosure that the foregoing detailed disclosure is intended to be presented by way of example only and is not limiting. Although there is no clear explanation here, those skilled in the art may make various modifications, improvements, and corrections for the present disclosure. Such modifications, improvements, and corrections are suggested in the present disclosure, so such modifications, improvements, and corrections still belong to the spirit and scope of the exemplary embodiments of the present disclosure.

Moreover, certain terminology has been used to describe embodiments of the present disclosure. For example, the terms "one embodiment," "an embodiment," and "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of the present disclosure are not necessarily all referring to the same embodiment. In addition, certain features, structures, or characteristics in one or more embodiments of the present disclosure may be properly combined.

Moreover, those skilled in the art will appreciate that various aspects of the present disclosure may be illustrated and described by certain patented types or situations, including any new and useful operations, machines, products or materials, or any new and useful improvements thereof. Correspondingly, all aspects of this instructions can be executed by hardware, can be fully executed by software (including firmware, resident software, microcodes, etc.), and can also be performed by hardware and software. The above hardware or software may be referred to as "block," "module," "engine," "unit," "component" or "system." In addition, all aspects of this manual may be manifested as a computer product located in one or more computers readable mediums, which include computers read-programs.

The computer storage medium may include a propagation data signal containing a computer program encoding, such as on a baseband or as part of a carrier. The propagation signal may have a variety of expressions, including electromagnetic form, optical form, or suitable combination form. The computer storage medium may be any computer readable medium except the computer readable medium. This medium can be connected to an instruction execution system, device, or device to achieve communication, dissemination, or transmission procedures. Program encoding on a computer storage medium may be propagated by any suitable medium, including radio, cable, fiber optic cable, RF, or a similar medium, or a combination of the above media.

The computer program encoding required by each part of the present disclosure may be written in any one or more programming languages, including object-oriented programming languages such as Java, Scala, Smalltalk, Eiffel, Jade, Emerald, C++, C#, VB.NET, Python, etc., regular programming languages such as C language, Visual Basic, Fortran2003, Perl, COBOL2002, PHP, ABAP, dynamic programming languages such as Python, Ruby and Groovy, or other programming languages, etc. The program encoding may be run over the user's computer, or as a stand-alone package runs on the user's computer, or part is running on the user's computer, or running on a remote computer or processing device. In the latter case, the remote computer can be connected to the user's computer through any network, such as a local area network (LAN) or a wide area network (WAN), or connected to an external computer (e.g., via the Internet), or in a cloud computing environment, or as a service Use such as software as a service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose of description and that the appended claims are not limited to the disclosed embodiments, on the contrary, are intended to cover modifications and equivalent combination s that are within the spirit and scope of the embodiments of the present disclosure. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. However, this disclosure method does not mean that the characteristics required by the object of the present disclosure are more than the characteristics mentioned in the claims. Rather, claimed subject matter may lie in less than all features of a single foregoing disclosed embodiment.

In some embodiments, the numbers expressing quantities, properties, and so forth, used to describe and claim certain embodiments of the application are to be understood as being modified in some instances by the term "about," "approximate," or "substantially." For example, "about," "approximate" or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, Application history documents that are inconsistent with or conflict with the content of the present disclosure are excluded, and documents (currently or later appended to the present disclosure) that limit the broadest scope of the claims of the present disclosure are excluded. By way of example, should there be any inconsistency or conflict between the description, definition, and/or the use of a term associated with any of the incorporated material and that associated with the present document, the description, definition, and/or the use of the term in the present document shall prevail.

Finally, it should be understood that the embodiments described in this description are intended only to illustrate the principles of the embodiments of the present description. Other deformation may also belong to the scope of the present disclosure. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A voice enhancement method applied to a voice enhancement system, comprising:

obtaining a first signal and a second signal of a target voice, the first signal and the second signal being voice signals of the target voice collected by different collection devices at different voice collection positions;

determining a target signal-to-noise ratio (SNR) of the target voice based on the first signal or the second signal;

determining a processing mode for the first signal and the second signal based on the target SNR; and obtaining a voice-enhanced output voice signal corresponding to the target voice by processing the first signal and the second signal based on the determined processing mode;

wherein the determining a processing mode for the first signal and the second signal based on the target SNR comprises:

in response to determining that the target SNR is smaller than a first threshold, processing the first signal and the second signal in a first mode; and in response to determining that the target SNR is greater than a second threshold, processing the first signal and the second signal in a second mode, wherein the first threshold is not larger than the second threshold, and computing resources allocated to the first mode is more than computing resources allocated to the second mode;

wherein the processing the first signal and the second signal in a first mode comprises:

obtaining a first output voice signal with a low frequency part of the target voice enhanced by processing a low frequency part of the first signal and a low frequency part of the second signal using a first processing technique, wherein the first processing technique includes:

obtaining a first downsampling signal by performing a downsampling on the first signal, and obtaining a second downsampling signal by performing a downsampling on the second signal;

obtaining a frequency domain signal of the first downsampling signal by translating the first downsampling signal from a time domain to a frequency domain, and obtaining a frequency domain signal of the second downsampling signal by translating the second downsampling signal from the time domain to the frequency domain;

obtaining an enhanced frequency domain signal corresponding to the target voice by processing the frequency domain signal of the first downsampling signal and the frequency domain signal of the second downsampling signal;

determining an enhanced voice signal based on the enhanced frequency domain signal;

obtaining the first output voice signal with the low frequency part of the target voice enhanced by upsampling a part of the enhanced voice signal;

obtaining a second output voice signal with a high frequency part of the target voice enhanced by processing a high frequency part of the first signal and a high frequency part of the second signal using a second processing technique; and obtaining the voice-enhanced output voice signal by combining the first output voice signal and the second output voice signal.

2. The method of claim 1, wherein the determining a target SNR of the target voice based on the first signal or the second signal comprises:

obtaining current frame data of the first signal and the second signal, respectively;

determining estimated SNR corresponding to the current frame data of the first signal and the second signal;

determining, based on frame data of at least one of the first signal and the second signal before the current frame data, a verification SNR of the target voice; and determining the target SNR corresponding to the current frame data of the first signal and the second signal based on the verification SNR and the estimated SNR.

3. The method of claim 2, wherein the determining, based on frame data of at least one of the first signal and the second signal before the current frame data, a verification SNR of the target voice; and determining the target SNR corresponding to the current frame data of the first signal and the second signal based on the verification SNR and the estimated SNR comprises:

obtaining at least one voice-enhanced frame data of the first signal and the second signal before the current frame data;

determining at least one verification SNR corresponding to the at least one voice-enhanced frame data; and determining the target SNR corresponding to the current frame data of the first signal and the second signal based on the at least one verification SNR and the estimated SNR.

4. The method of claim 1, wherein the first processing technique further comprises:

supplementing the first downsampling signal and the second downsampling signal so that their signal lengths and sampling frequencies meet a preset condition.

5. The method of claim 1, wherein the obtaining an enhanced frequency domain signal corresponding to the target voice by processing the frequency domain signal of the first downsampling signal and the frequency domain signal of the second downsampling signal comprises:

obtaining the enhanced frequency domain signal by performing a differential operation on the frequency domain signal of the first downsampling signal and the frequency domain signal of the second downsampling signal based on a difference factor between a noise signal of the first downsampling signal and a noise signal of the second downsampling signal, wherein the difference factor is determined based on signal energies of the first downsampling signal and the second downsampling signal.

6. The method of claim 1, wherein the obtaining an enhanced frequency domain signal corresponding to the target voice by processing the frequency domain signal of the first downsampling signal and the frequency domain signal of the second downsampling signal comprises:

obtaining a preliminary enhanced frequency domain signal by performing a differential operation on the frequency domain signal of the first downsampling signal and the frequency domain signal of the second downsampling signal based on a difference factor between a noise signal of the first downsampling signal and a noise signal of the second downsampling signal; and obtaining the enhanced frequency domain signal by performing the differential operation based on the preliminary enhanced frequency domain signal, the frequency domain signal of the first downsampling signal, and the frequency domain signal of the second downsampling signal.

7. The method of claim 6, wherein the preliminary enhanced frequency domain signal, the frequency domain signal of the first downsampling signal, or the frequency domain signal of the second downsampling signal corresponds to a first weight coefficient, the first weight coefficient being related to a voice existence probability of a currently processed signal.

8. The method of claim 1, wherein the first processing technique further comprises:

updating signal values of signal points in the enhanced frequency domain signal whose signal values are smaller than a preset parameter.

9. The method of claim 1, wherein the second processing technique comprises:

obtaining a first high frequency band signal corresponding to the high frequency part of the first signal and a second high frequency band signal corresponding to the high frequency part of the second signal; and obtaining the second output voice signal with the high frequency part of the target voice enhanced by performing a differential operation based on the first high frequency band signal and the second high frequency band signal.

10. The method of claim 9, wherein the performing a differential operation based on the first high frequency band signal and the second high frequency band signal comprises:

obtaining a first upsampling signal and a second upsampling signal by upsampling the first high frequency band signal and the second high frequency band signal, respectively; and obtaining the second output voice signal with the high frequency part of the target voice enhanced by performing the differential operation on the first upsampling signal and the second upsampling signal.

11. The method of claim 9, wherein the differential operation comprises:

performing the differential operation based on a first timing signal of the first high frequency band signal and at least one timing signal of the second high frequency band signal before the timing of the first timing signal.

12. The method of claim 11, wherein in the at least one timing signal before the timing of the first timing signal, each timing signal corresponds to a second weight coefficient, and the method comprises:

performing the differential operation based on the first timing signal of the first high frequency band signal, the at least one timing signal of the second high frequency band signal before the timing of the first timing signal, and the second weight coefficient corresponding to the at least one timing signal.

13. A voice enhancement device, comprising:

collection devices located at different voice collection positions;

at least one terminal;

at least one storage medium; and at least one processor, wherein the at least one storage medium is configured to store a computer instruction; and the at least one processor is configured to execute the computer instruction to implement operations including:

obtaining a first signal and a second signal of a target voice, the first signal and the second signal being voice signals of the target voice by the collection devices located at the different voice collection positions;

determining a target signal-to-noise ratio (SNR) of the target voice based on the first signal or the second signal;

determining a processing mode for the first signal and the second signal based on the target SNR; and obtaining a voice-enhanced output voice signal corresponding to the target voice by processing the first signal and the second signal based on the determined processing mode;

the at least one terminal is configured to receive the voice-enhanced output voice signal corresponding to the target voice;

wherein the determining a processing mode for the first signal and the second signal based on the target SNR comprises:

in response to determining that the target SNR is smaller than a first threshold, processing the first signal and the second signal in a first mode; and in response to determining that the target SNR is greater than a second threshold, processing the first signal and the second signal in a second mode, wherein the first threshold is not larger than the second threshold, and computing resources allocated to the first mode is more than computing resources allocated to the second mode;

wherein the processing the first signal and the second signal in a first mode comprises:

obtaining a first output voice signal with a low frequency part of the target voice enhanced by processing a low frequency part of the first signal and a low frequency part of the second signal using a first processing technique, wherein the first processing technique includes:

obtaining a first downsampling signal by performing a downsampling on the first signal, and obtaining a second downsampling signal by performing a downsampling on the second signal;

obtaining a frequency domain signal of the first downsampling signal by translating the first downsampling signal from a time domain to a frequency domain, and obtaining a frequency domain signal of the second downsampling signal by translating the second downsampling signal from the time domain to the frequency domain;

obtaining an enhanced frequency domain signal corresponding to the target voice by processing the frequency domain signal of the first downsampling signal and the frequency domain signal of the second downsampling signal;

determining an enhanced voice signal based on the enhanced frequency domain signal;

obtaining the first output voice signal with the low frequency part of the target voice enhanced by upsampling a part of the enhanced voice signal;

obtaining a second output voice signal with a high frequency part of the target voice enhanced by processing a high frequency part of the first signal and a high frequency part of the second signal using a second processing technique; and obtaining the voice-enhanced output voice signal by combining the first output voice signal and the second output voice signal.

* * * * *